United States Patent
Hayashi et al.

(10) Patent No.: US 8,454,863 B2
(45) Date of Patent: Jun. 4, 2013

(54) METHOD OF AND APPARATUS FOR MANUFACTURING MULTI-LAYER OPTICAL INFORMATION RECORDING MEDIUM

(75) Inventors: Kazuhiro Hayashi, Osaka (JP); Kazuya Hisada, Osaka (JP); Kazuhiro Higashimaru, Osaka (JP); Eiji Ohno, Osaka (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 12/264,345

(22) Filed: Nov. 4, 2008

(65) Prior Publication Data

US 2009/0065131 A1    Mar. 12, 2009

Related U.S. Application Data

(62) Division of application No. 10/431,656, filed on May 7, 2003, now Pat. No. 7,460,463.

(30) Foreign Application Priority Data

May 10, 2002 (JP) ................................. 2002-135270

(51) Int. Cl.
 *B29D 17/00* (2006.01)
(52) U.S. Cl.
 USPC ........... 264/2.1; 264/1.33; 264/494; 264/496; 264/310; 264/334
(58) Field of Classification Search
 USPC ................. 264/1.33, 2.1, 494, 496, 310, 334
 See application file for complete search history.

(56) References Cited

U.S. PATENT DOCUMENTS

| | | | |
|---|---|---|---|
| 5,230,973 A | 7/1993 | Yoshioka et al. | |
| 5,946,286 A | 8/1999 | Bahns | |
| 6,033,728 A * | 3/2000 | Kikuchi et al. | 427/240 |
| 6,136,133 A | 10/2000 | Maruyama et al. | |
| 6,270,611 B1 | 8/2001 | Ohki et al. | |
| 6,603,733 B2 | 8/2003 | Tsukagoshi et al. | |

(Continued)

FOREIGN PATENT DOCUMENTS

| | | |
|---|---|---|
| EP | 1 126 443 A | 8/2001 |
| EP | 1 187 122 A2 | 3/2002 |

(Continued)

OTHER PUBLICATIONS

English machine translation of JP 09-115191, provided by JPO, Oct. 6, 2010.*

(Continued)

*Primary Examiner* — Timothy Kennedy
(74) *Attorney, Agent, or Firm* — RatnerPrestia

(57) ABSTRACT

A transfer layer on a surface of a mold has a thickness distribution along the radius direction that the layer is thick in an inner round portion but is gradually thinner toward an outer round portion. An adhesive layer is formed between a surface of a signal substrate which bears a signal recording film and the mold which seats the transfer layer. The adhesive layer has a thickness distribution that the layer is thin in an inner round portion but is gradually thicker toward an outer round portion. Since the thickness distributions along the radius direction of the transfer layer and the adhesive layer are opposite to each other, the thickness distribution of an isolation layer which comprises the two layers is uniform.

20 Claims, 15 Drawing Sheets

U.S. PATENT DOCUMENTS

| | | |
|---|---|---|
| 6,661,745 B1 | 12/2003 | Tominaga et al. |
| 6,735,165 B1 | 5/2004 | Zhou et al. |
| 2001/0052320 A1 | 12/2001 | Komaki et al. |
| 2002/0018438 A1* | 2/2002 | Tsukagoshi et al. ....... 369/275.3 |
| 2002/0031632 A1 | 3/2002 | Hisada et al. |
| 2003/0185143 A1 | 10/2003 | Lin et al. |
| 2004/0232570 A1* | 11/2004 | Hayashi et al. ................. 264/1.1 |

FOREIGN PATENT DOCUMENTS

| | | | |
|---|---|---|---|
| JP | 7-296356 A | | 11/1995 |
| JP | 8-5979 A | | 1/1996 |
| JP | 8-306085 A | | 11/1996 |
| JP | 09115191 A | * | 5/1997 |
| JP | 11-195251 A | | 7/1999 |
| JP | 2000-57640 A | | 2/2000 |
| JP | 2001-351275 A | | 12/2001 |
| JP | 2002-260307 | | 9/2002 |
| WO | WO 02101736 A1 | * | 12/2002 |

OTHER PUBLICATIONS

DERWENT abstract of JP 09-115191, 1997.*
European Search Report corresponding to Application No. EP 03-01-0498 dated Sep. 6, 2004.

* cited by examiner

METHOD OF AND APPARATUS FOR MANUFACTURING MULTI-LAYER OPTICAL INFORMATION RECORDING MEDIUM

This application is a Divisional of U.S. patent application Ser. No. 10/431,656 filed May 7, 2003 the entire disclosure of which is incorporated herein by reference.

BACKGROUND OF THE INVENTION

1. Field of the Invention

The present invention relates to a method of and an apparatus for manufacturing a multi-layer optical information recording medium on whose one surface recording and reproduction are performed and which comprises an isolation layer between a plurality of signal recording layers.

2. Related Art of the Invention

As a high-density optical information recording medium, a multi-layer optical information recording medium, such as a DVD of the single-side/dual-layer reproducing format, has been proposed which comprises a plurality of signal recording surfaces along the thickness direction. For example, a DVD of the single-side/dual-layer reproducing format has a structure that a translucent reflection layer of gold, silicon or the like is formed on the information recording surface of one of two substrates and a conventional reflection layer of aluminum or the like is formed on the information recording surface of the other one and that the reflection layers are bonded in such a manner that these information recording surfaces are directed toward the inner side.

Further, for an improvement in surface recording density per layer, a high-density optical information recording medium has been proposed which uses a blue-violet laser source (whose wavelength is about 400 nm) and a high-NA lens and comprises a thin recording/reproduction side transparent cover layer whose thickness is as thin as 0.1 mm. This high-density optical information recording medium has a structure that a signal guide groove or pit is formed in a surface of a thick signal substrate, a recording multi-layer film which is rewritable is formed on this, and a transparent cover layer is formed further on this. Even a high-density optical information recording medium of this thin transparent cover layer type may be modified to comprise two signal recording surfaces. The following is one example of a method of fabricating the same.

(1) On a thick substrate which seats a rewritable recording multi-layer film whose surface comprises guide grooves or pits representing signals, an isolation layer is further formed using an UV curable resin, and on a surface of the isolation layer, second-layer guide grooves or pits representing signals are formed.

(2) On the second-layer guide grooves or pits representing signals, a translucent recording multi-layer film which is rewritable is formed.

(3) A thin recording/reproduction side transparent cover layer whose thickness is as thin as 0.1 mm is formed.

As a specific fabrication method (See Japanese Patent Application Laid-Open Gazette No. 2002-260307), using a plastic mold 2100 for the step (1) above, the signal guide grooves or pits on the mold 2100 are covered and a first UV curable resin is applied and hardened. Following this, using a second UV curable resin which has a different property as an adhesive layer, the substrate seating a first signal recording layer 2106 and the hardened first UV curable resin are bonded together, and the mold 2100 is peeled off from the second UV curable resin after hardening. In this manner, an isolation layer 2110 is formed from the first UV curable resin and the second UV curable resin. When such a method is used, it is possible to fabricate a multi-layer optical information recording medium by laminating one signal recording layer 2106 and further a plurality of signal recording layers 2106 on a thick signal substrate 2105 which is rigid through the isolation layer 2110. The entire disclosure of the document mentioned above is incorporated herein by reference in its entirety.

However, it is necessary that the thickness of the isolation layer 2110 which exists between the signal recording layers 2106 is uniform in the multi-layer optical information recording medium. The uniform thickness of the isolation layer 2110 results in a constant level of influence of reflected light from one signal recording layer 2106 which is either before or after the isolation layer 2110 upon the other signal recording layer 2106 which is either before or after the isolation layer 2110 during recording or reproduction. A variation in reflected light from this signal recording layer 2106 creates a disturbance component in a reproduction signal, which deteriorates S/N. On the contrary, when the thickness of the isolation layer 2110 is uniform, disturbance from this signal recording layer 2106 becomes constant, and therefore, recording or reproduction becomes stable and the quality of the reproduction signal improves.

FIG. 12 is drawings which show a change with time in dripping amount of an UV curable resin onto the signal substrate 2105 or the mold 2100 and the number of revolutions of the signal substrate 2105 or the mold 2100 in a condition that the UV curable resin is being dripped during fabrication of a conventional multi-layer optical information recording medium. As shown in FIG. 12, according to a conventional manufacturing method, the UV curable resin is dripped in the vicinity of a central portion of the signal substrate 2105 or the mold 2100, and after the end of dripping, the signal substrate 2105 or the mold 2100 is rotated and the UV curable resin is stretched from the area close to the central portion of the signal substrate 2105 or the mold 2100 toward the outer side owing to the resulting centrifugal force.

When such a manufacturing method described above is used, because of the centrifugal force resulting from the rotations of the mold 2100 or the signal substrate 2105, the thickness of the UV curable resin becomes thicker toward the outer side than toward the center side of the mold 2100 or the signal substrate 2105. Hence, as shown in FIG. 13, the thickness of the isolation layer 2110, too, tends to become thicker toward the outer side from the center side of the isolation layer 2110 which is formed by joining UV curable resins which have different properties from each other. Thus, the S/N ratio of a multi-layer optical information recording medium according to the conventional fabrication method is not satisfactory as described above.

SUMMARY OF THE INVENTION

In light of the problems with the conventional fabrication method described above, the present invention aims at providing a method of and an apparatus for manufacturing a multi-layer optical information recording medium which permits to stably record in signal recording layers which are disposed on the both sides of an isolation layer, stably reproduce from the signal recording layers and obtain an excellent signal.

The $1^{st}$ aspect of the present invention is a method of manufacturing a multi-layer optical information recording medium on whose one surface recording and reproduction are performed and which comprises an isolation layer between a plurality of signal recording layers, comprising the steps of:

(a) forming an n+1$^{-th}$ layer adjacent to a surface on a mold in which there is a signal recording area which contains at least one of a guide groove and a pit; and (b) forming an n$^{-th}$ layer adjacent to a signal substrate which comprises said signal recording layers, wherein said isolation layer is formed by joining said n+1$^{-th}$ layer and said n$^{-th}$ layer, and a thickness distribution along the radius direction of at least one of said n+1$^{-th}$ layer and said n$^{-th}$ layer is generated or controlled based on a thickness distribution along the radius direction of the other one of said n+1$^{-th}$ layer and said n$^{-th}$ layer.

The 2$^{nd}$ aspect of the present invention is the method of manufacturing a multi-layer optical information recording medium of the 1$^{st}$ aspect, wherein said n+1$^{-th}$ layer and said n$^{-th}$ layer are each formed so as to have predetermined thickness distributions, and the thickness distribution along the radius direction of said at least one layer is controlled considering the thickness distribution along the radius direction of the other layer.

With the method of manufacturing a multi-layer optical information recording medium according to the first or the second invention described above, since the radius-direction thickness distribution of either one of the n+1$^{-th}$ layer and the n$^{-th}$ layer is controlled considering the radius-direction thickness distribution of the other one, it is possible to control a thickness distribution of the isolation layer which comprises the both and makes the thickness distribution uniform. This allows to stably record in and reproduce from the signal recording layers which are disposed on the both sides of the isolation layer, and hence, to obtain an excellent signal.

The 3$^{rd}$ aspect of the present invention is the method of manufacturing a multi-layer optical information recording medium of the 1$^{st}$ aspect or the 2$^{nd}$ aspect, wherein a thickness distribution along the radius direction of said isolation layer is substantially uniform.

With the method of manufacturing a multi-layer optical information recording medium according to the third invention described above, since the radius-direction thickness distributions of both the n+1$^{-th}$ layer and the n$^{-th}$ layer are controlled, it is possible to control a thickness distribution of the isolation layer which comprises the both and makes the thickness distribution uniform. This allows to stably record in and reproduce from the signal recording layers which are disposed on the both sides of the isolation layer, and hence, to obtain an excellent signal.

The 4$^{th}$ aspect of the present invention is the method of manufacturing a multi-layer optical information recording medium of the 1$^{st}$ aspect, further comprising a step of peeling said mold off from said n+1$^{-th}$ layer.

The 5$^{th}$ aspect of the present invention is the method of manufacturing a multi-layer optical information recording medium of the 1$^{st}$ aspect, wherein the thickness distribution along the radius direction of said n+1$^{-th}$ layer is that the layer is thinner in an outer round portion than in an inner round portion of said mold, while the thickness distribution along the radius direction of said n$^{-th}$ layer is that the layer is thicker in an outer round portion than in an inner round portion in said signal substrate. Using such a manufacturing method above, it is possible to ensure that the isolation layer which comprises the n+1$^{-th}$ layer and the n$^{-th}$ layer is uniform.

The 6$^{th}$ aspect of the present invention is the method of manufacturing a multi-layer optical information recording medium of the 5$^{th}$ aspect, wherein said n+1$^{-th}$ layer is of a radiation curable material, and said step (a) comprises a step of dripping said radiation curable material onto said inner round portion of said mold or said inner round portion within said n$^{-th}$ layer of said signal substrate and a step of rotating said mold or said signal substrate to which said radiation curable material has been dripped.

The 7$^{th}$ aspect of the present invention is the method of manufacturing a multi-layer optical information recording medium of the 6$^{th}$ aspect, wherein said step of rotating said mold or said signal substrate to which said radiation curable material has been dripped is followed by a step of superposing said mold and said signal substrate one atop the other in such a manner that said n+1$^{-th}$ layer is positioned on the inner side, and further by a step of emitting radiation and accordingly irradiating said radiation curable material.

The 8$^{th}$ aspect of the present invention is the method of manufacturing a multi-layer optical information recording medium of the 6$^{th}$ aspect, wherein said step (a) comprises a step of dripping said radiation curable material onto said inner round portion of said mold or said inner round portion within said n$^{-th}$ layer of said signal substrate and a step of rotating said mold or said signal substrate to which said radiation curable material has been dripped.

The 9$^{th}$ aspect of the present invention is the method of manufacturing a multi-layer optical information recording medium of any one of the 6$^{th}$ aspect through the 8$^{th}$ aspect, wherein portions of said step of dripping said radiation curable material onto said inner round portion of said mold or said inner round portion within said n$^{-th}$ layer of said signal substrate and said step of rotating said mold or said signal substrate to which said radiation curable material has been dripped are executed simultaneously. Using such a manufacturing method above, it is possible to easily control the thickness distribution along the radius direction of the n+1$^{-th}$ layer.

The 10$^{th}$ aspect of the present invention is the method of manufacturing a multi-layer optical information recording medium of any one of the 6$^{th}$ aspect through the 8$^{th}$ aspect, wherein said mold or said signal substrate is rotated while dripping said radiation curable material onto said inner round portion of said mold or said inner round portion within said n$^{-th}$ layer of said signal substrate.

The 11$^{th}$ aspect of the present invention is the method of manufacturing a multi-layer optical information recording medium of any one of the 6$^{th}$ aspect through the 8$^{th}$ aspect, wherein before dripping said radiation curable material onto said inner round portion of said mold or said inner round portion within said n$^{-th}$ layer on said signal substrate, in the event that there is a center hole approximately at the center of said mold or said n$^{-th}$ layer of said signal substrate, said center hole is capped with a lid and said radiation curable material is then dripped from above said lid. Using such a manufacturing method above, it is possible to easily control the thickness distribution along the radius direction of the n+1$^{-th}$ layer.

The 12$^{th}$ aspect of the present invention is the method of manufacturing a multi-layer optical information recording medium of the 1$^{st}$ aspect, wherein the thickness distribution along the radius direction of said n+1$^{-th}$ layer is thicker in an outer round portion than in an inner round portion of said mold, while the thickness distribution along the radius direction of said n$^{-th}$ layer is thinner in an outer round portion than in an inner round portion in said signal substrate. Using such a manufacturing method above, it is possible to ensure that the isolation layer which comprises the n+1$^{-th}$ layer and the n$^{-th}$ layer is uniform.

The 13$^{th}$ aspect of the present invention is the method of manufacturing a multi-layer optical information recording medium of the 12$^{th}$ aspect, wherein said n$^{-th}$ layer is of a radiation curable material, and said step (b) comprises: a step of dripping said radiation curable material onto said inner round portion within said n+1$^{-th}$ layer of said mold or said inner round portion of said signal substrate; a step of rotating said mold or said signal substrate to which said radiation curable material has been dripped; a step of superposing said mold and said signal substrate one atop of the other after the rotations in such a manner that the surface coated with said radiation curable material is directed toward the inner side; and a step of emitting radiation and accordingly hardening said radiation curable material. Using such a manufacturing method above, it is possible to easily bond the mold seating the $n+1^{-th}$ layer with the signal substrate.

The $14^{th}$ aspect of the present invention is the method of manufacturing a multi-layer optical information recording medium of the $13^{th}$ aspect, wherein portions of said step of dripping said radiation curable material onto said inner round portion of said mold or said inner round portion of said signal substrate and said step of rotating said mold or said signal substrate to which said radiation curable material has been dripped are executed simultaneously. Using such a manufacturing method above, it is possible to easily control the thickness distribution along the radius direction of the $n^{-th}$ layer.

The $15^{th}$ aspect of the present invention is the method of manufacturing a multi-layer optical information recording medium of the $14^{th}$ aspect, wherein the rotations are effected while dripping said radiation curable material onto said inner round portion of said mold or said inner round portion of said signal substrate.

The $16^{th}$ aspect of the present invention is the method of manufacturing a multi-layer optical information recording medium of any one of the $13^{th}$ aspect through the $15^{th}$ aspect, wherein before dripping said radiation curable material, in the event that there is a center hole approximately at the center of said mold or said signal substrate, said center hole is capped with a lid and said radiation curable material is then dripped from above said lid. Using such a manufacturing method above, it is possible to easily control the thickness distribution along the radius direction of the $n^{-th}$ layer.

The $17^{th}$ aspect of the present invention is the method of manufacturing a multi-layer optical information recording medium of the $7^{th}$ aspect or the $13^{th}$ aspect, wherein said step of superposing in such a manner that the surface of said mold or said signal substrate coated with said radiation curable material is directed toward the inner side is executed under a reduced pressure. Using such a manufacturing method above, it is possible to prevent air bubbles from getting mixed into the isolation layer.

The $18^{th}$ aspect of the present invention is the method of manufacturing a multi-layer optical information recording medium of the $5^{th}$ aspect or the $12^{th}$ aspect, wherein said $n+1^{-th}$ layer contains a pressure-sensitive adhesive which hardens when irradiated with radiation. Such a manufacturing method above realizes easy control of the thickness distribution since the viscosity of the pressure-sensitive adhesive is high, and ensures reliable transfer of a signal from the mold.

The $19^{th}$ aspect of the present invention is the method of manufacturing a multi-layer optical information recording medium of the $5^{th}$ aspect or the $12^{th}$ aspect, wherein said $n^{-th}$ layer contains a pressure-sensitive adhesive. Such a manufacturing method above realizes easy control of the thickness distribution of the $n^{-th}$ layer since the viscosity of the pressure-sensitive adhesive is high.

The $20^{th}$ aspect of the present invention is the method of manufacturing a multi-layer optical information recording medium of the $5^{th}$ aspect, wherein said $n^{-th}$ layer is of a radiation curable material, and said step (b) comprises: a step of dripping a radiation curable material for adhesion which is for forming said $n^{-th}$ layer onto at least one of said $n+1^{-th}$ layer of said mold and said signal substrate; a step of rotating said mold and said signal substrate, with said mold and said signal substrate superposed one atop of the other in such a manner that said $n+1^{-th}$ layer is positioned on the inner side, so as to stretch said radiation curable material for adhesion; and a step of emitting radiation and accordingly hardening said radiation curable material. Using such a manufacturing method above, it is possible to prevent entry of air bubbles without reducing the pressure since air bubbles inside the $n^{-th}$ layer are loosed during stretching.

The $21^{st}$ aspect of the present invention is the method of manufacturing a multi-layer optical information recording medium of the $12^{th}$ aspect, wherein said $n+1^{-th}$ layer is of a radiation curable material, and said step (a) comprises: a step of dripping a radiation curable material for transfer which is for forming said $n+1^{-th}$ layer onto at least one of said mold and said $n^{-th}$ layer on said signal substrate; a step of rotating said mold and said signal substrate, with said mold and said signal substrate superposed one atop of the other in such a manner that said $n^{-th}$ layer is positioned on the inner side, so as to stretch said radiation curable material for transfer; and a step of emitting radiation and accordingly hardening said radiation curable material.

The $22^{nd}$ aspect of the present invention is an apparatus for manufacturing a multi-layer optical information recording medium on whose one surface recording and reproduction are performed and which comprises an isolation layer between a plurality of signal recording layers, comprising:

$n+1^{-th}$ layer forming means which, at the time of forming said isolation layer on said signal recording layers, forms an $n+1^{-th}$ layer on a surface of a mold in which there is a signal recording area which contains at least one of a guide groove and a pit, while controlling a thickness distribution along the radius direction of said mold;

bonding means which forms an $n^{-th}$ layer, whose thickness distribution is controlled along the radius direction, between said $n+1^{-th}$ layer which is on said mold and a signal substrate which comprises said signal recording layers, and bonds said $n+1^{-th}$ layer which is on said mold with said signal substrate; and peeling means which peels off said mold from said $n+1^{-th}$ layer and accordingly obtains said isolation layer which comprises said $n+1^{-th}$ layer, whose surface seats a signal on said mold which has been transferred, and said $n^{-th}$ layer. Using such an apparatus for manufacturing a multi-layer optical information recording medium described above, it is possible to control the thickness distribution of the isolation layer which comprises both the $n+1^{-th}$ layer and the $n^{-th}$ layer and makes the thickness distribution uniform since the thickness distributions along the radius direction of the $n+1^{-th}$ layer and the $n^{-th}$ layer are controlled, and therefore, an improvement in mass productivity attributed to a better yield is expected. Further, it is possible to stably record in and reproduce from the signal recording layers which are disposed on the both sides of the isolation layer, and hence, to obtain an excellent signal.

The $23^{rd}$ aspect of the present invention is the apparatus for manufacturing a multi-layer optical information recording medium of the $22^{nd}$ aspect, wherein in the event that said $n+1^{-th}$ layer is of a radiation curable material, said $n+1^{-th}$ layer forming means comprises:

dripping means which drips said radiation curable material onto an inner round portion of said mold;

rotating means which rotates said mold to which said radiation curable material has been dripped; and hardening means which emits radiation and accordingly hardens said radiation curable material. Such a structure described above makes it possible to easily form the $n+1^{-th}$ layer.

The 24$^{th}$ aspect of the present invention is the apparatus for manufacturing a multi-layer optical information recording medium of the 23$^{rd}$ aspect, wherein said mold is rotated while dripping said radiation curable material onto said inner round portion of said mold.

The 25$^{th}$ aspect of the present invention is the apparatus for manufacturing a multi-layer optical information recording medium of the 23$^{rd}$ aspect or the 24$^{th}$ aspect, wherein before dripping said radiation curable material onto said inner round portion of said mold, in the event that there is a center hole approximately at the center of said mold, said center hole is capped with a lid and said radiation curable material is then dripped from above said lid. Such a structure described above makes it possible to easily control the thickness distribution along the radius direction of the n+1$^{-th}$ layer.

The 26$^{th}$ aspect of the present invention is the apparatus for manufacturing a multi-layer optical information recording medium of the 22$^{nd}$ aspect, wherein in the event that said n$^{-th}$ layer is of a radiation curable material, said bonding means comprises:

dripping means which drips said radiation curable material onto an inner round portion within said n+1$^{-th}$ layer of said mold or an inner round portion of said signal substrate;

rotating means which rotates said mold or said signal substrate to which said radiation curable material has been dripped;

superposing means which superposes said mold and said signal substrate one atop of the other after the rotations in such a manner that the surface coated with said radiation curable material is directed toward the inner side; and hardening means which emits radiation and accordingly hardens said radiation curable material. Such a structure described above makes it possible to easily bond the mold seating the n+1$^{-th}$ layer with the signal substrate.

The 27$^{th}$ aspect of the present invention is the apparatus for manufacturing a multi-layer optical information recording medium of the 26$^{th}$ aspect, wherein the rotations are effected while dripping said radiation curable material onto said inner round portion of said mold or said inner round portion of said signal substrate.

The 28$^{th}$ aspect of the present invention is the apparatus for manufacturing a multi-layer optical information recording medium of the 26$^{th}$ aspect or the 27$^{th}$ aspect, wherein before dripping said radiation curable material, in the event that there is a center hole approximately at the center of said mold or said signal substrate, said center hole is capped with a lid and said radiation curable material is then dripped from above said lid. Such a structure described above makes it possible to easily control the thickness distribution along the radius direction of the n$^{-th}$ layer.

The 29$^{th}$ aspect of the present invention is the apparatus for manufacturing a multi-layer optical information recording medium of the 26$^{th}$ aspect, wherein said superposing means contains depressurizing means, and superposes said mold and said signal substrate one atop the other after reducing an ambient pressure with said depressurizing means. Such a structure described above prevents air bubbles from getting mixed into the isolation layer, and an improvement in yield is expected.

The 30$^{th}$ aspect of the present invention is the apparatus for manufacturing a multi-layer optical information recording medium of the 22$^{nd}$ aspect, wherein in the event that said n$^{-th}$ layer is of a radiation curable material, said bonding means comprises:

dripping means which drips a radiation curable material for adhesion which is for forming said n$^{-th}$ layer onto at least one of said n+1$^{-th}$ layer which is on said mold and said signal substrate;

stretching means which superposes said mold and said signal substrate one atop the other in such a manner that said n+1$^{-th}$ layer is positioned on the inner side, rotates said mold and said signal substrate and stretches said radiation curable material for adhesion; and hardening means which emits radiation and accordingly hardens said radiation curable material. Such a structure described above looses air bubbles inside the n$^{-th}$ layer without reducing the pressure during stretching and prevents entry of air bubbles, and therefore, an improvement in yield is expected.

The 31$^{st}$ aspect of the present invention is a multi-layer optical information recording medium, comprising:

a substrate layer which is capable of holding signal information;

an n$^{-th}$ layer which is formed above said substrate layer;

an n+1$^{-th}$ layer which is formed above said n$^{-th}$ layer; and a protection layer which is formed above said n+1$^{-th}$ layer, wherein the thickness as it is with said n$^{-th}$ layer and said n+1$^{-th}$ layer superposed one atop the other is uniform.

The 32$^{nd}$ aspect of the present invention is the multi-layer optical information recording medium of the 31$^{st}$ aspect, wherein the thickness of said n+1$^{-th}$ layer along the radius direction and the thickness of said n$^{-th}$ layer along the radius direction are reciprocal from each other.

DESCRIPTION OF SYMBOLS

Figure 1:
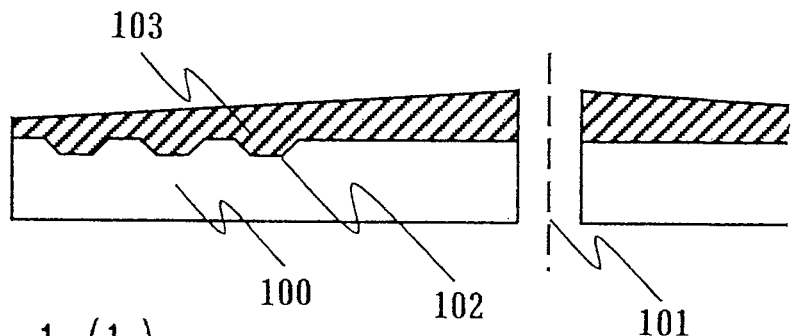
FIG. 1 is a schematic diagram which shows the method of manufacturing a multi-layer optical information recording medium according to one embodiment of the present invention.
Figure 1:
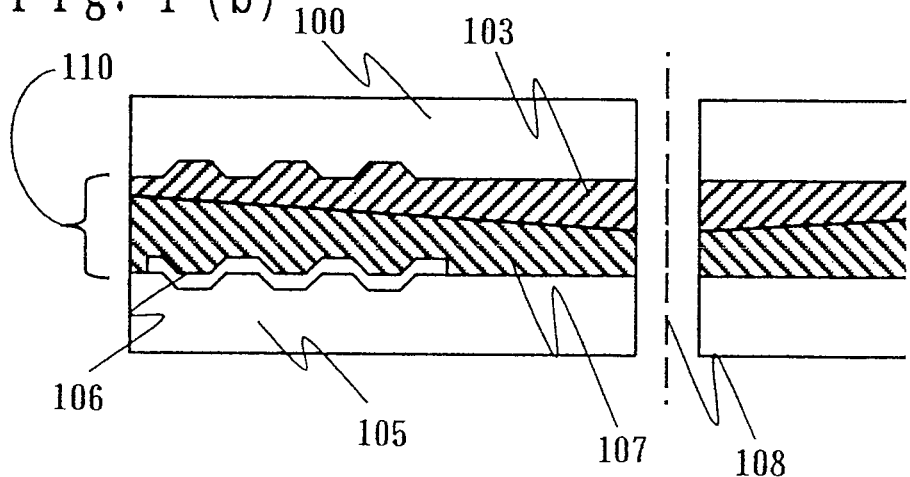
Figure 1:
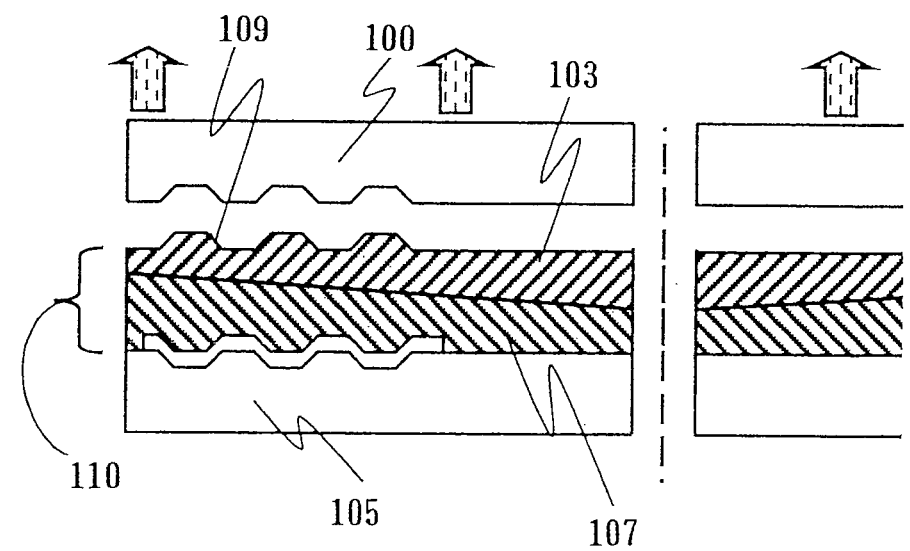

100 mold
101, 108, 1006, 1106 center hole
102 concave/convex portion
103 transfer layer
105 signal substrate
106 signal recording film
107, 706, 804 adhesive layer
109 transferred concave/convex portion
110 isolation layer
200, 403, 802 UV curable resin
201, 401, 701 rotation table
202 lid
205, 400 nozzle
210 UV lamp
402, 703, 1001 center pin
404 ring-shaped UV curable resin
405 stretched adhesive layer
600 fixing stage
601 center post
602 nozzle
610 wedge
615 compressed air
620 pre-peeling intermediate article
702 table
704 vacuum pump
705 depressurizing chamber
801 stretched transfer layer
803 hardened transfer layer
1000 fix table
1005, 1105 pressure-sensitive adhesive
1010 roller
1100 balloon
1101 air

PREFERRED EMBODIMENTS OF THE INVENTION

Preferred embodiments of the present invention will now be described in detail with reference to the associated drawings.

Embodiment 1

An embodiment 1 will now be described with reference to FIG. 1. This is an example that there is a tendency that a thickness distribution along the radius direction of a transfer layer, which is one example of the $n+1^{-th}$ layer according to the present invention, is thick in an inner round portion of a mold but is gradually thinner toward outer rounds and that a thickness distribution along the radius direction of an adhesive layer, which is one example of the $n^{-th}$ layer according to the present invention, is thin in an inner round portion of a signal substrate but is gradually thicker toward outer rounds.

FIG. 1 is a conceptual diagram of the present invention. First, as shown in FIG. 1(*a*), a transfer layer 103 is formed on concave/convex portions 102 in a surface of a mold 100 which is circular. The concave/convex portions 102 formed within a signal recording area comprise at least one of a guide groove and a pit. An example may be a groove whose track pitch is 0.32 micron and depth is 20 nm and which comprises a wobble which is indicative of address information. Further, there may be a center hole 101 at the center of the mold 100. The transfer layer 103 is formed so as to have a thickness distribution along the radius direction that the layer is thick in an inner round portion of the mold but is gradually thinner toward an outer round portion of the mold.

Next, as shown in FIG. 1(*b*), a signal recording film 106, which is one example of the signal recording layer according to the present invention, is disposed on a surface of the signal substrate 105. An adhesive layer 107 is formed between the surface of the signal substrate 105 which seats the signal recording film 106 and the mold 100 which seats the transfer layer 103, thereby bonding the mold 100 and the signal substrate 105. The signal substrate 105 may comprise a center hole 108. The adhesive layer 107 is formed so as to have a thickness distribution along the radius direction that the layer is thin in an inner round portion but is gradually thicker toward an outer round portion. Since the thickness distributions of the transfer layer 103 and the adhesive layer 107 are opposite to each other, an isolation layer 110 which comprises these two layers has a uniform thickness distribution. At last, as shown in FIG. 1(*c*), the mold 100 is peeled off from the interface with the transfer layer 103. On a surface of the transfer layer 103, concave/convex portions 109 transferred from the mold 100 are formed. While the transfer layer 103 is a layer for transfer of the concave/convex portions 102 on the mold 100, it is necessary to appropriately choose the respective materials so that the peeling at the interface between the transfer layer 103 and the mold 100 will be easy.

In the manner described above, the isolation layer 110 whose thickness distribution is uniform along the radius direction is obtained. On the transferred concave/convex portions 109 of the isolation layer 110, a further isolation layer or a protection layer 3000 is formed after forming a signal recording film 3001. This is the outline of the present invention. The signal substrate 105 may comprise other signal recording layer (not shown) below the signal recording film 106. In other words, the signal recording film 106 may be formed on the isolation layer.

The steps shown in FIGS. 1(*a*) through (*c*) will now be described in detail.

Figure 2:
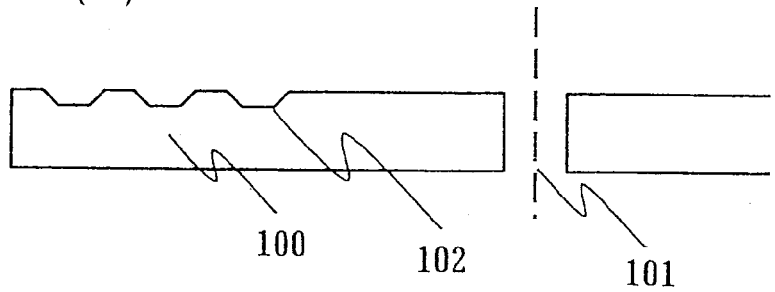
FIG. 2 is a drawing which shows one example of the method of applying the transfer layer at the transfer layer forming step according to one embodiment of the present invention.
Figure 2:
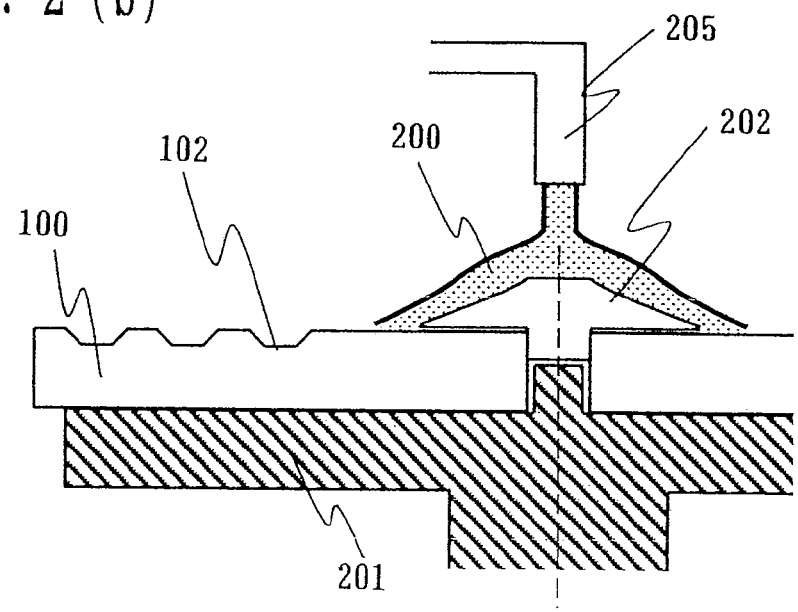
Figure 2:
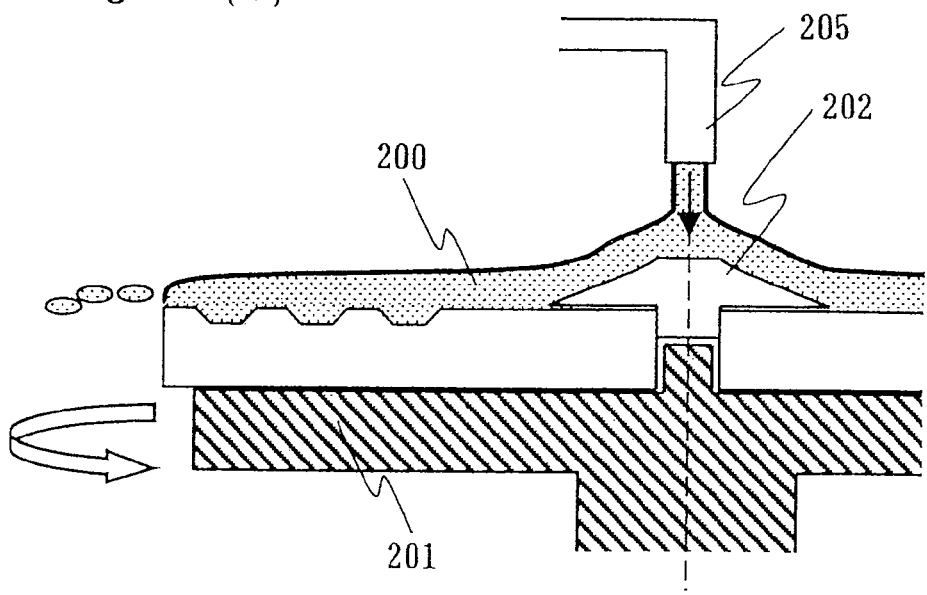
Figure 3:
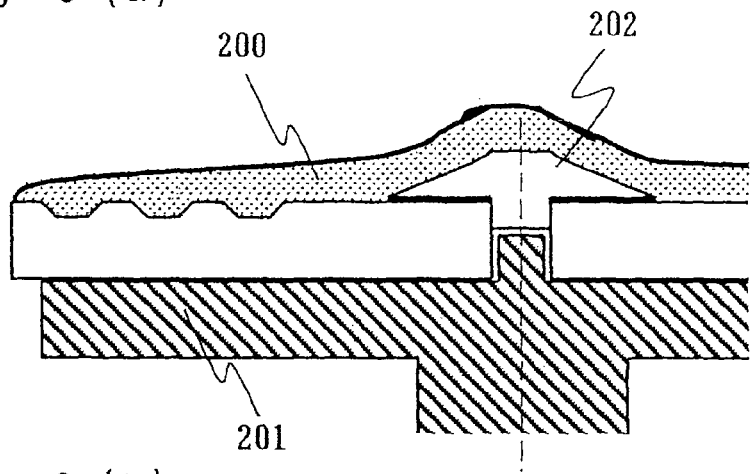
FIG. 3 is a drawing which shows one example of the method of hardening the transfer layer at the transfer layer forming step according to one embodiment of the present invention.
Figure 3:
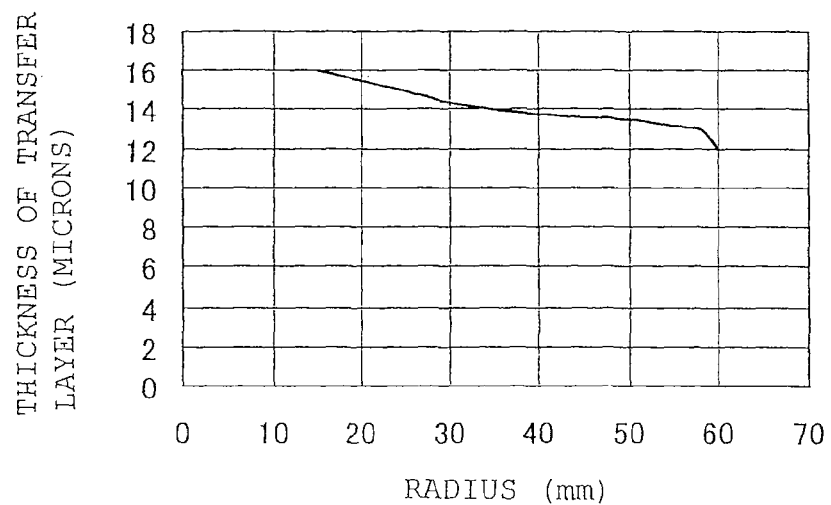
Figure 3:
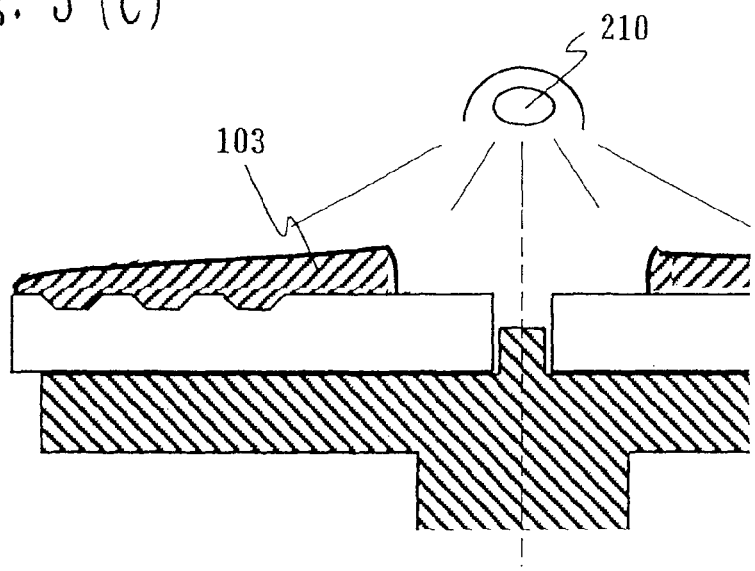

First, a step of forming the transfer layer will be described in relation to one example. FIGS. 2 and 3 show an example that the transfer layer is formed through spin coating, using an UV curable resin, which is one example of the radiation curable material according to the present invention, as the material of the transfer layer. The mold 100 comprising the center hole 101 as that shown in FIG. 2(*a*) is prepared. The diameter of the center hole 101 is 15 mm, and the outer diameter of the mold 100 is 120 mm. Since an UV curable resin is used as the material of the transfer layer, it is preferable that the material of the mold is plastic which is transparent to UV light to a certain extent such as an acrylic resin, an olefine resin, polycarbonate and a norbornene-based resin.

Next, as shown in FIG. 2(b), the mold 100 is placed on a rotation table 201. The rotation table 201 fixes the mold 100 by vacuum suction or otherwise appropriate method. The center hole 101 is covered with a lid 202. While the lid 202 may have outer dimensions with a diameter of 15 mm through 42 mm, the diameter is 22 mm in this example. A nozzle 205 is positioned above the lid 202, and dripping of an UV curable resin 200 which is the material of the transfer layer is started. The rotation table 201 may start rotating before the dripping. The viscosity of the UV curable resin 200 is 150 mPa·s. For the UV curable resin 200, it is necessary to select such a material which is easily peeled off from the interface with the mold 100 as shown in FIG. 1(c). An example is an acrylic material which causes radical polymerization under irradiation of UV light. The resin dripping time is 9 sec. Approximately at the same time as the dripping, the rotation table 201 starts rotating as shown in FIG. 2(c). The initial 6 sec is a low speed but the subsequent number of revolutions is 2000 rpm, and the rotation time at 2000 rpm is 10 sec. Hence, rotations continue for 7 sec after the dripping ends. The rotation table 201 stops rotating after the rotations.

Steps following the stop are shown in FIG. 3. FIG. 3(a) shows a state immediately after the stop. The tendency is that the layer is thick in an inner round portion of the mold but is gradually thinner toward an outer round portion of the mold. FIG. 3(b) shows the thickness of the transfer layer along the radius direction. The layer is as thick as about 15 microns in the vicinity of the radius of 20 mm but is gradually thinner along the radius direction with a distance from the center and becomes about 13 microns over 58 mm from the center in the radius direction. Such a thickness distribution can be controlled based on the dripping time for dripping the UV curable resin, the number of revolutions of the rotation table during the dripping and the rotation time after the termination of the dripping. As the number of revolutions and the rotation time increase, the thickness distribution along the radius direction changes less and becomes generally uniform.

At last, as shown in FIG. 3(c), with the lid 202 removed from above the mold 100, the UV curable resin 200 is hardened using an UV lamp 210, thereby obtaining the transfer layer 103. The purpose of removing the lid 202 prior to the hardening is to prevent the UV curable resin 200 from becoming solid after the hardening so that the lid 202 gets removed easily. The lid 202 may be grabbed at with a robot arm for removal, or may be partially formed by a magnetic material and lifted up using a magnet. Although the hardening occurs on the rotation table 201 in FIG. 3(c), the mold 100 may be moved over to a different table which is equipped with an UV lamp for hardening. The UV lamp 210 may be a metal halide lamp, a mercury lamp, a xenon lamp, etc.

Figure 4:
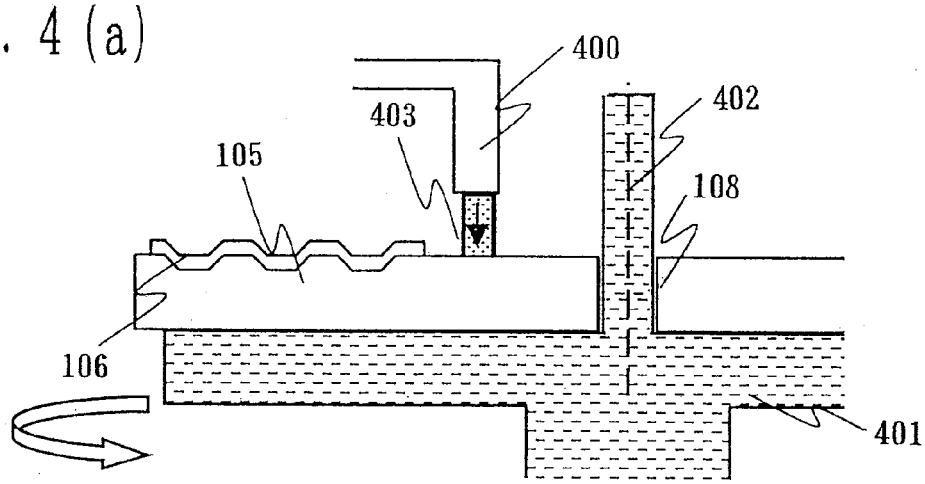
FIG. 4 is a drawing which shows one example of the adhesive layer forming step according to one embodiment of the present invention.
Figure 4:
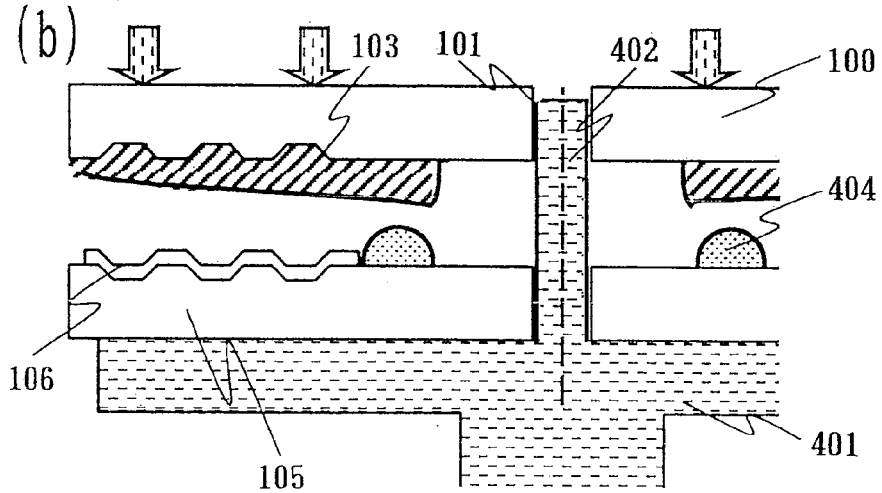
Figure 4:
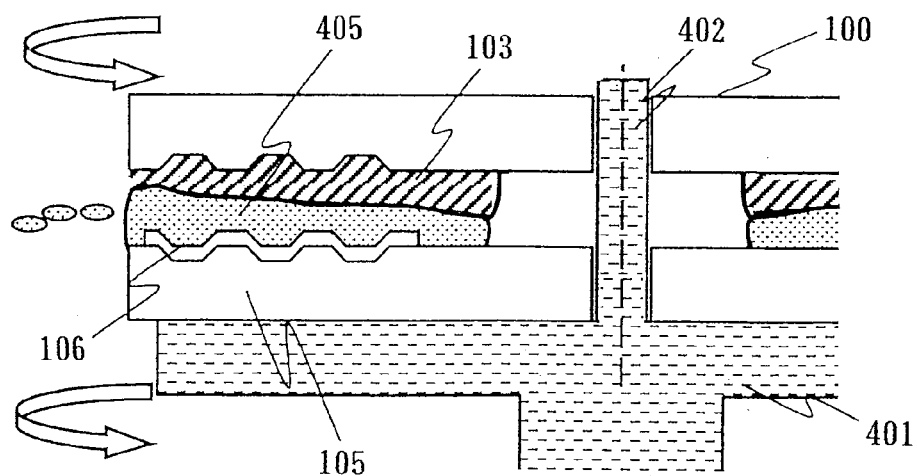

A step of forming the adhesive layer will now be described in relation to one example. This example uses an UV curable resin as the adhesive layer. As the UV curable resin, it is necessary to choose a material which strongly adheres to the material of the signal substrate, the material of the signal recording layers, and further, to the transfer layer 103. An example is an acrylic material. FIG. 4 shows stretching of the adhesive layer through spinning. As shown in FIG. 4(a), the signal substrate 105 which seats the signal recording film 106 is placed and fixed on a rotation table 401. The signal substrate 105 has outer dimensions with a diameter of 120 mm, the diameter of the center hole 108 is 15 mm, and the material of the signal substrate 105 is polycarbonate, plastic of acryl or olefin, etc. The signal recording film 106 may be a phase-conversion film of GeSbTe, AgInSbTe or the like, a recording film such as a magnetic film or a pigment film, dielectric films of ZnS or the like which sandwich these films, and a metal reflection film, etc. Sputtering, vapor deposition or the like is generally used for film deposition.

Fixing on the rotation table 401 is realized by means of vacuum suction of a contact surface with the signal substrate 105. A center pin 402 which fits in the center hole 108 is disposed to the rotation table 401, which allows centering of the signal substrate 105. With the rotation table 401 rotating, an UV curable resin 403 is dripped out from a nozzle 400 which is disposed at the radius of 20 through 30 mm on the signal substrate 105. An acrylic resin whose viscosity is 450 mPa·s is used as the UV curable resin 403 in this example. Since the signal substrate 105 is rotated, the UV curable resin 403 becomes ring-shaped.

The mold 100 obtained through the steps shown in FIGS. 2 and 3 is then superposed on the signal substrate 105. As shown in FIG. 4(b), there is the ring-shaped UV curable resin 404 on the signal substrate 105, the mold 100 is placed on this from above in such a manner that the transfer layer 103 contacts the ring-shaped UV curable resin 404. The center hole 101 of the mold 100, having the diameter of 15 mm, fits with the center pin 402, which aligns the center of the signal substrate 105 with the center of the mold 100. The superposition may be carried out under a reduced pressure, for the purpose of avoiding air bubbles which may get mixed in when the transfer layer 103 contacts the ring-shaped UV curable resin 404.

The rotation table 401 then rotates at a high speed as shown in FIG. 4(c), whereby the UV curable resin stretches all over the surface. In this example, the rotation table 401 then rotates at a high speed of 5000 rpm for 30 sec. As a result, thus stretched adhesive layer 405 is formed between the transfer layer 103 and the signal substrate 105. For stable peeling at a peeling step which follows this, it is necessary that the adhesive layer 405 stretched as shown in FIG. 4(c) is not in a direct contact with the mold 100. After the stretching, thus stretched adhesive layer 405 is hardened from the mold 100 side using an UV lamp in a similar fashion to that shown in FIG. 3(c). Since the mold 100 is transparent, hardening is possible.

Figure 5:
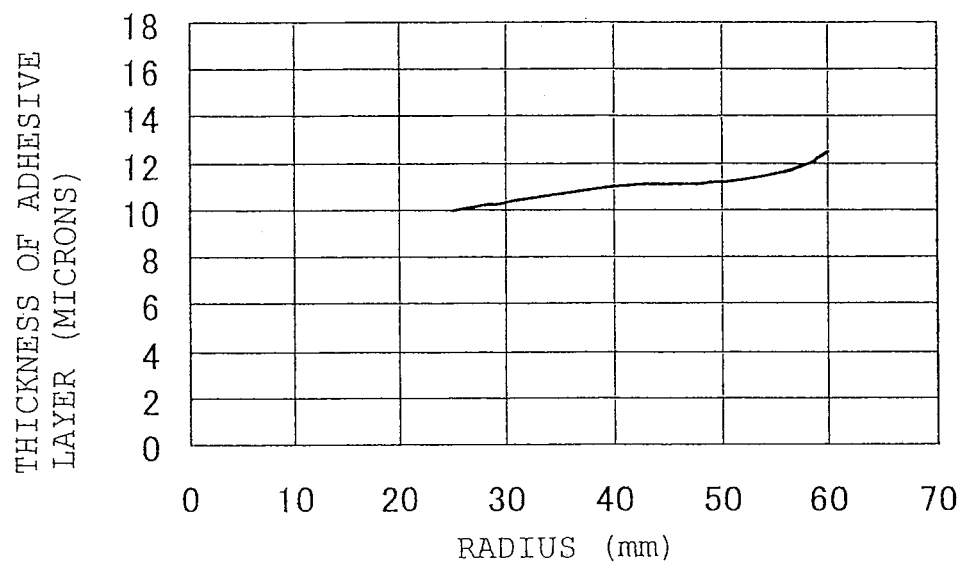
FIG. 5 is a drawing which shows the thickness distributions of the adhesive layer and the isolation layer which are obtained as a result of the steps which are shown in FIGS. 2, 3 and 4.
Figure 5:
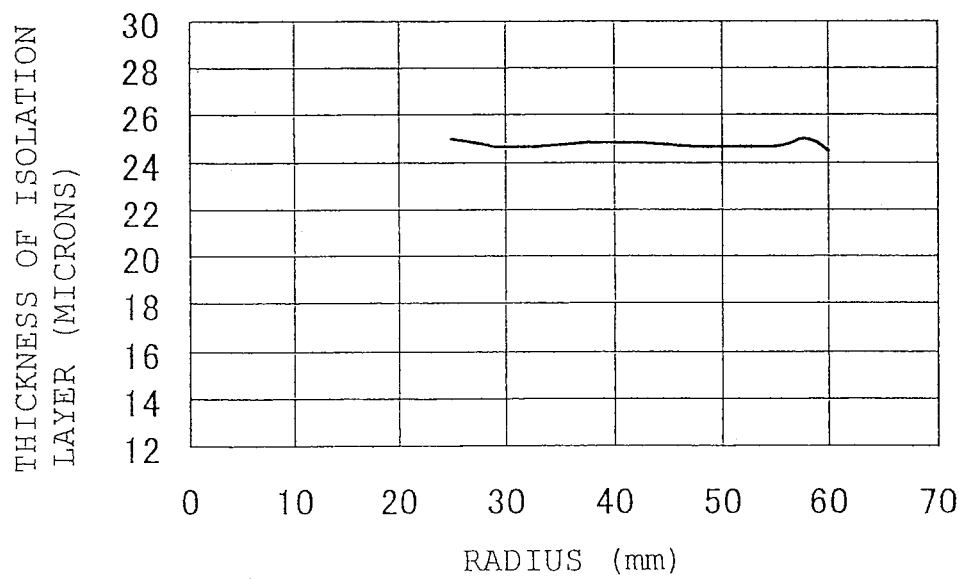

FIG. 5 shows a thickness distribution of thus obtained adhesive layer and a thickness distribution of the isolation layer which is comprised of the transfer layer and the adhesive layer. As shown in FIG. 5(a), the thickness distribution of the adhesive layer is that the layer is 10 microns in an inner round portion of the layer but is gradually thicker toward an outer round portion of the layer and becomes 12.5 microns at an outer circumferential edge, owing to centrifugal force resulting from the high-speed rotations. Meanwhile, the thickness distribution of the isolation layer which is comprised of the transfer layer and the adhesive layer is as shown in FIG. 5(b). The thickness distribution, which is a combination of FIG. 3(b) and FIG. 5(a), is that the layer is within a range of 24.5±0.5 microns from the inner rounds through the outer rounds and thus considerably uniform.

Figure 6:
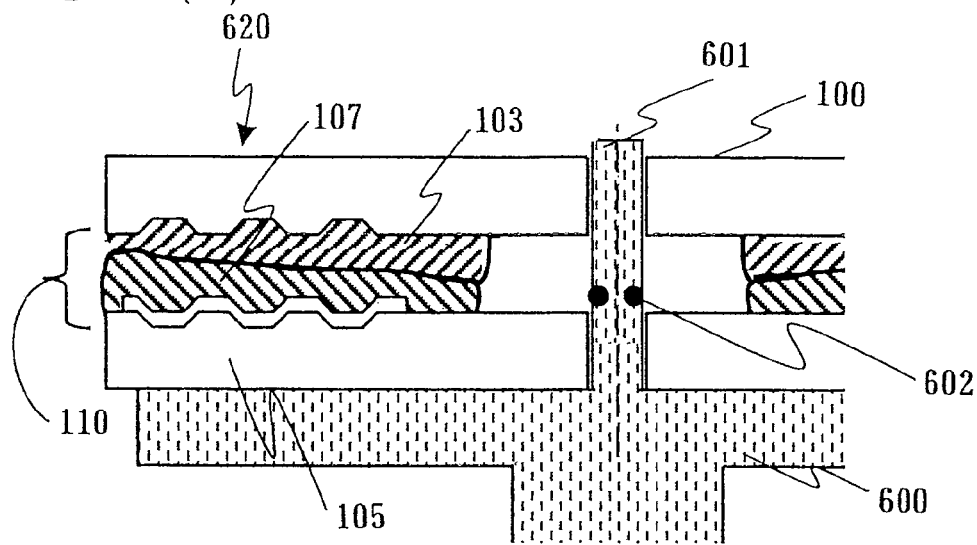
FIG. 6 is a drawing which shows one example of the peeling step of peeling off the mold according to one embodiment of the present invention.
Figure 6:
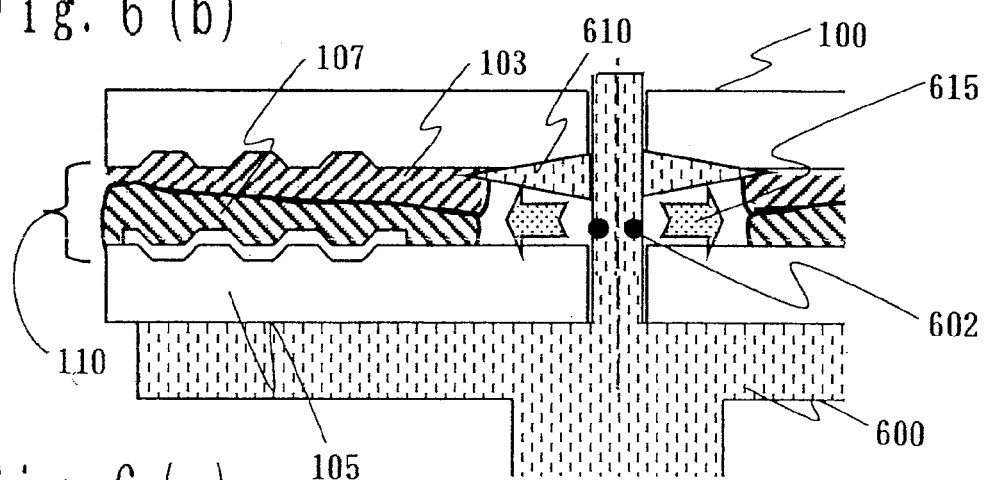
Figure 6:
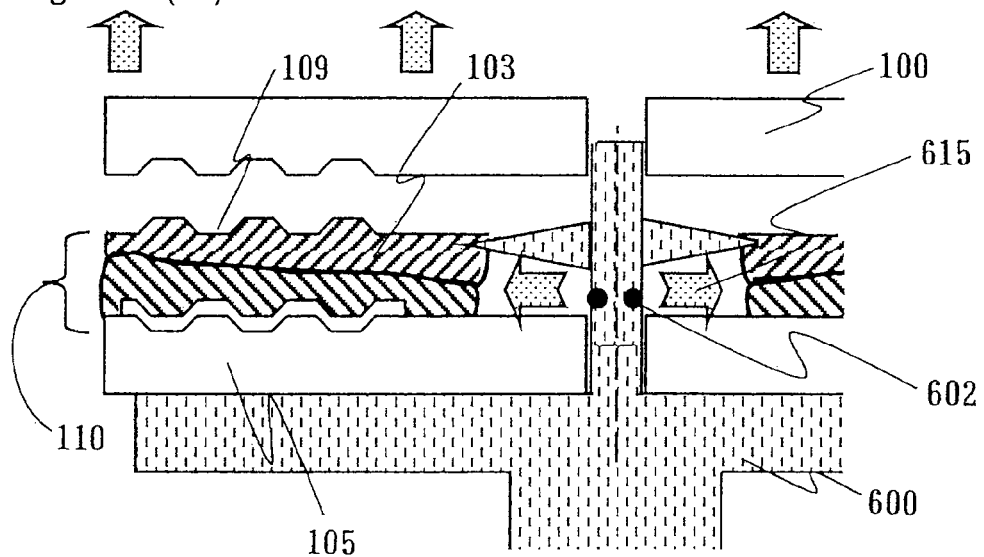

At last, FIG. 6 shows the peeling step of peeling off the mold. The illustrated peeling method uses a wedge and compressed air. As FIG. 6(a) shows, a pre-peeling intermediate article 620, which is the mold 100 and the signal substrate 105 as they are bonded to each other, obtained at the bonding step is fixed on a fixing stage 600. Vacuum suction is a preferable fixing method. A center post 610 is disposed to the fixing stage 600, and a nozzle 602 is formed in a part of the center post 610.

A wedge 610 is then pushed out from the center post 601 as shown in FIG. 6(b) and inserted to the interface between the mold 100 and the transfer layer 103. At this stage, the transfer layer 103 may be displaced to a certain extent because of the wedge 610. After the wedge 610 is inserted, compressed air 615 is gushed out through the nozzle 602. The compressed air 615 enters the interface between the mold 100 and the transfer layer 103 to which the wedge 610 has been inserted, and starts peeling off the mold 100. After a while, the mold 100 is finely peeled off from the interface with the transfer layer 103 as shown in FIG. 6(c), thereby exposing the concave/convex portions 109 transferred to the surface of the isolation layer 110 (the surface of the transfer layer 103). In FIG. 6(b), in the event that the peeling does not progress with the compressed air 615 alone, the mold 100 may be lifted up from above, and the peeling will proceed more efficiently.

In order to complete the post-peeling signal substrate as a multi-layer optical information recording medium, it is necessary to form the signal recording layers further on thus transferred concave/convex portions 109 through sputtering and uniformly form a transparent cover layer (whose thickness is 75 microns for instance) further on this, after the peeling step shown in FIG. 6. A method of forming the transparent cover layer may be a method which requires to bond, with a transparent adhesive, a transparent film whose thickness accuracy is high and whose thickness is thinner than that of the desired transparent cover layer, or alternatively, a method which requires to directly form a layer having a desired thickness level using a transparent overcoat agent. In a multi-layer optical information recording medium fabricated by the method described in relation to this embodiment, since the isolation layer which isolates the signal recording layers from each other is uniform, a stray light or the like from the signal recording layer which is adjacent to the signal recording layer in which recording or reproduction is being executed exerts a constant level of influence at any radius, which in turn makes it possible to stably record or reproduce and obtain an excellent and stable signal at any radius.

While this embodiment uses UV curable resins for both the transfer layer and the adhesive layer, a thermosetting material may be used instead, in which case it is necessary to choose metals such as nickel and iron, or highly heat-resisting plastics such as an ABS resin as the material of the mold.

In addition, although the mold 100 is superposed from above the signal substrate 105 in FIG. 4, the mold 100 may be placed below and the signal substrate 105 may be superposed from above. Further, although the UV curable resin for adhesion 403 is dripped upon the signal substrate 105, the UV curable resin for adhesion 403 may be dripped upon the transfer layer 103 which is on the mold 100. Any one of the signal substrate 105 and the mold 100 may be placed on the other. In addition, the UV curable resin for adhesion 403 may be dripped upon both the signal substrate 105 and the mold 100. In either case, a rotating condition may be determined considering the wettability of the UV curable resin for adhesion and the surface subjected to the drops and the like, so as to obtain a desired thickness distribution for the adhesive layer.

Embodiment 2

Figure 7:
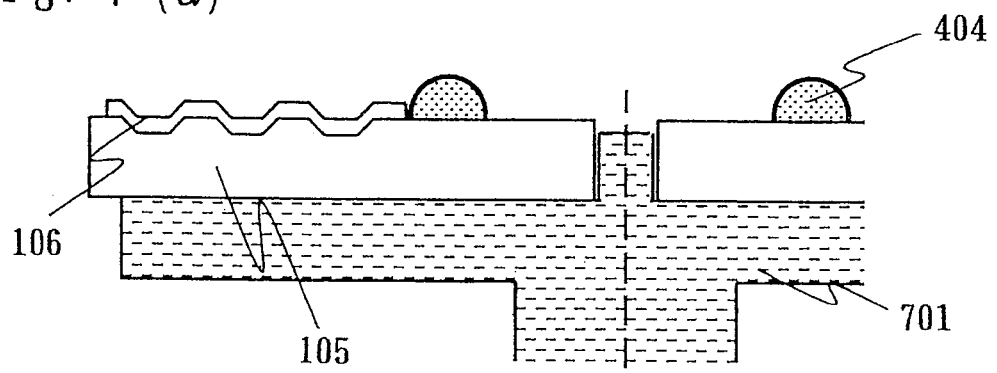
FIG. 7 is a drawing which shows the second example of the adhesive layer forming step according to one embodiment of the present invention.
Figure 7:
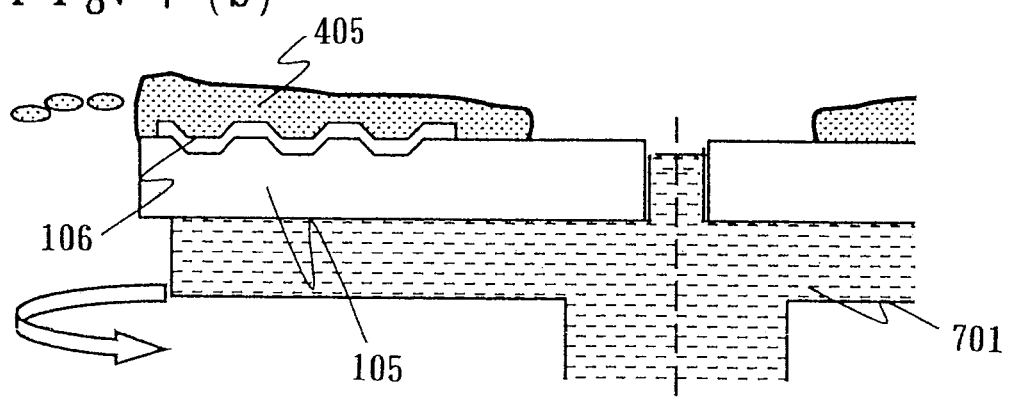
Figure 7:
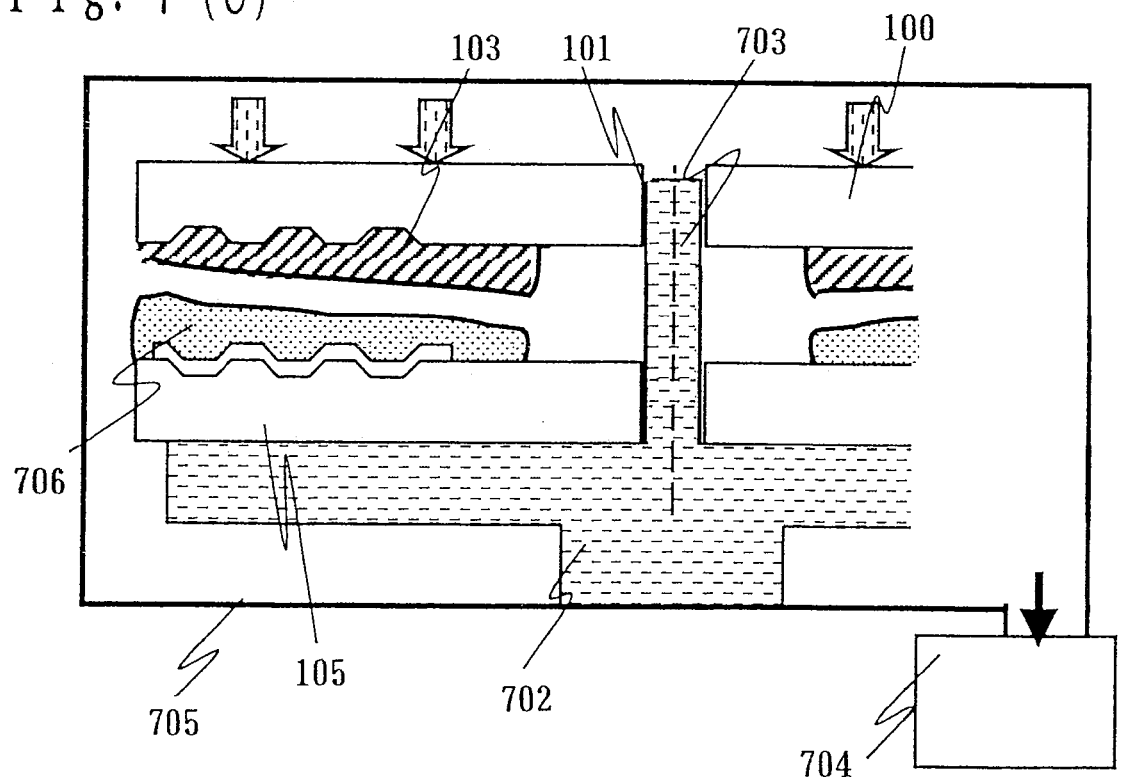

In relation to the embodiment 2, a second adhesive layer forming step will be described which is different from the method of forming the adhesive layer shown in FIG. 4. FIG. 7 is a conceptual diagram. As shown in FIG. 7(a), the signal substrate 105 is held to a rotation table 701 and the ring-shaped UV curable resin 404 is disposed in a similar fashion to that shown in FIG. 4(a). However, the dripping position is at the radius of 15 mm, which is toward the inner side as compared to the embodiment 1. The UV curable resin for adhesion may be the same as that used in the embodiment 1.

The rotation table 701 is then rotated at a high speed as shown in FIG. 7(b). As a result, the stretched adhesive layer 405 is formed on the signal substrate 105. A rotating condition is 5000 rpm for 20 sec. Under this condition, a thickness distribution which is approximately the same as that shown in FIG. 5(a) is obtainable. The mold 100 now seating the transfer layer 103 obtained as shown in FIG. 3(c) and the signal substrate 105 now seating an adhesive layer 706 are then loaded into a depressurizing chamber 705 and superposed one atop the other under a reduced pressure as shown in FIG. 7(c). They are superposed in such a manner that the transfer layer 103 and the adhesive layer 706 contact with each other. There is a table 702 for fixing the signal substrate 105 within the depressurizing chamber 705. A center pin 703 is disposed to the table 702, which allows to align the mold 100 which is placed from above and the fixed signal substrate 105 at the center.

After the loading of the signal substrate 105 and the mold 100, the depressurizing chamber 705 is depressurized by means of a vacuum pump 704. Since the superposition is carried out under a reduced pressure, air bubbles will not get mixed in between the transfer layer 103 and the adhesive layer 706. The depressurizing chamber 705 is opened to atmosphere and air is introduced after the superposition, the signal substrate 105 and the mold 100 are unloaded, and the adhesive layer 706 is hardened using the UV lamp 210 as shown in FIG. 3(c). After the hardening, the mold 100 is peeled off by the method shown in FIG. 6. Steps after the peeling are similar to those described in relation to the embodiment 1 and therefore will not be described again.

Although the embodiment 2 requires to form the adhesive layer 706 on the signal substrate 105 and the mold 100 is superposed, the adhesive layer 706 may be formed on the transfer layer 103 and placed on the signal substrate 105 which does not comprise an adhesive layer. Alternatively, adhesive layers may be disposed to both the signal substrate 105 and the mold 100 and the two may be superposed one atop the other. In either case, a rotating condition may be determined considering the wettability of the UV curable resin for adhesion and the surface subjected to the drops and the like, so as to obtain a desired thickness distribution for the adhesive layer.

In addition, after the step shown in FIG. 7(c), the signal substrate 105 and the mold 100 superposed one atop the other may be unloaded from the depressurizing chamber 705 and loaded into a pressurizing chamber, to thereby burst very small air bubbles (which contain depressurized air inside) by means of autoclave.

Embodiment 3

In relation to the embodiment 3, an example will be described in which there is a tendency is that the thickness distribution along the radius direction of the transfer layer is that the layer is thin in the inner round portion of the mold but is gradually thicker toward the outer rounds and the thickness distribution along the radius direction of the adhesive layer is that the layer is thick in the inner round portion of the signal substrate but is gradually thinner toward the outer rounds. The transfer layer is formed as shown in FIGS. 7(a) and (b), and the adhesive layer is formed by a method which is approximately the same as that shown in FIGS. 2 and 3. First, the outline of the steps will be described with reference to FIG. 8.

Figure 8A:
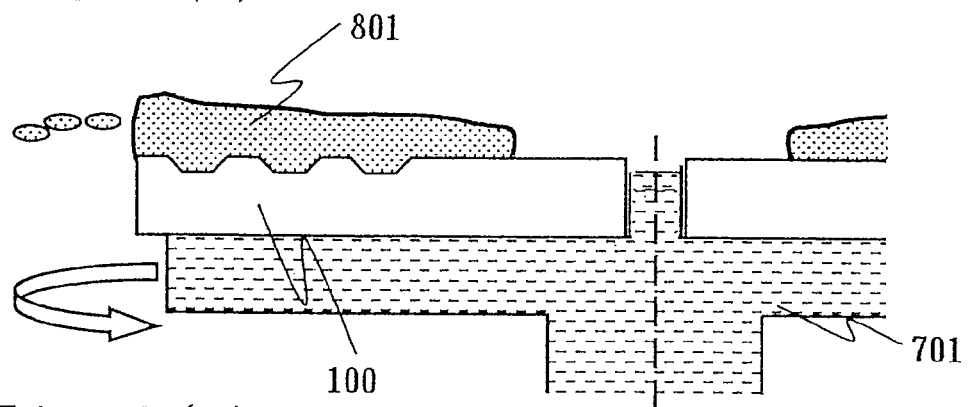
FIG. 8 is a drawing which shows the method of forming the transfer layer and the adhesive layer which have different thickness distributions from those shown in FIGS. 2 through 7.
Figure 9:
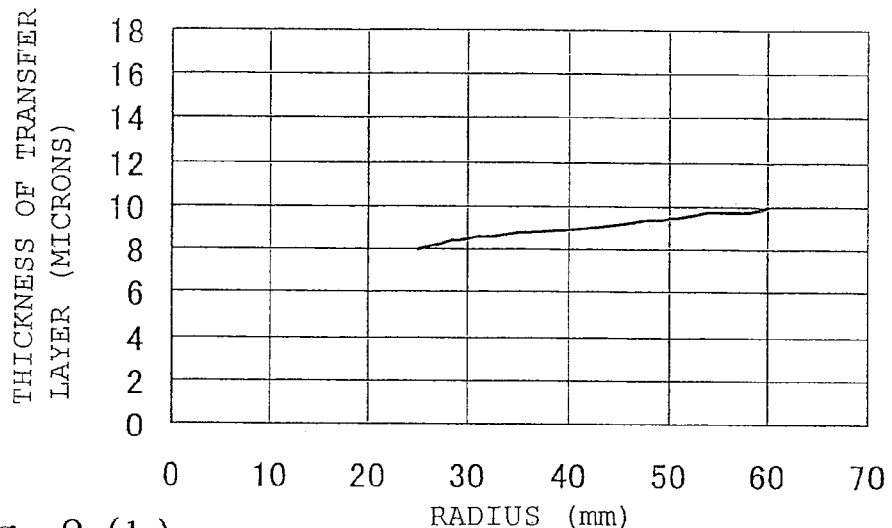
FIG. 9 is a drawing which shows the thickness distributions which are obtained by the forming method which is shown in FIG. 8.
Figure 9:
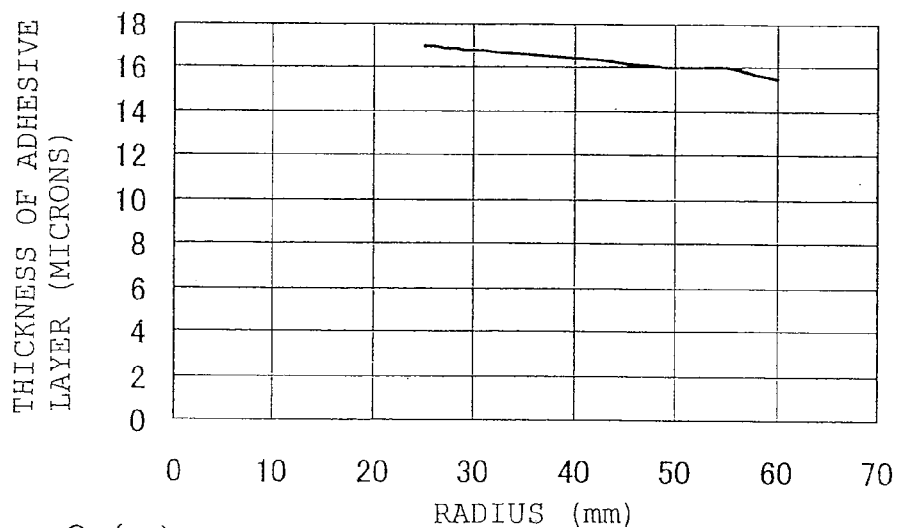
Figure 9:
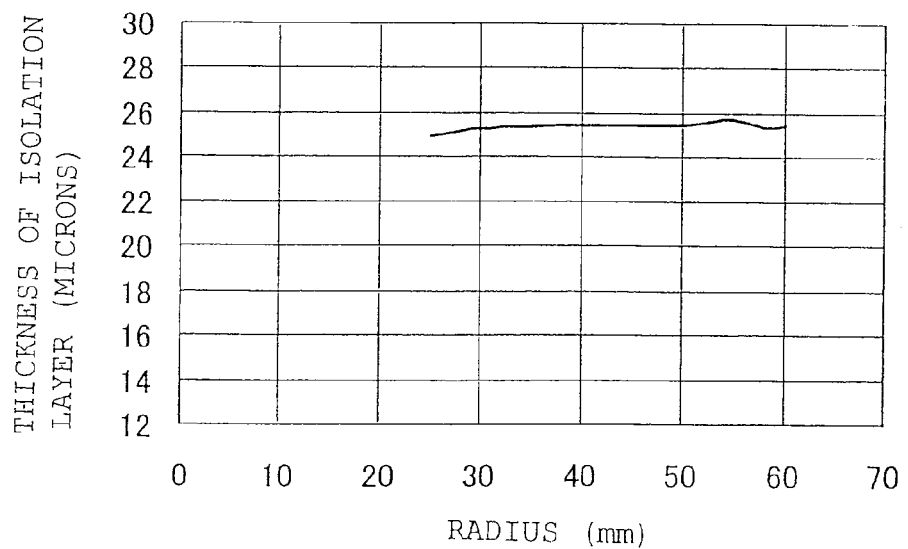

First, the transfer layer is formed. As shown in FIG. 8(a), an UV curable resin for transfer is dripped upon the mold 100 which is fixed to the rotation table 701, the rotation table 701 rotates, and the UV curable resin stretches. The mold 100 may be the same as that used in the embodiments 1 and 2. The UV curable resin may be the same as that used in the embodiments 1 and 2. The dripping position is at the radius of 11 mm. The rotations are at 4000 rpm, and the rotation time is 5 sec. The transfer layer 801 thus stretched is hardened using an UV lamp, after the end of the rotations. FIG. 9(*a*) shows a thickness distribution of thus stretched transfer layer 801. The layer tends to become gradually thicker, starting at 8 microns in the inner round portion and reaching 10 microns in the outer round portion.

Figure 8B:
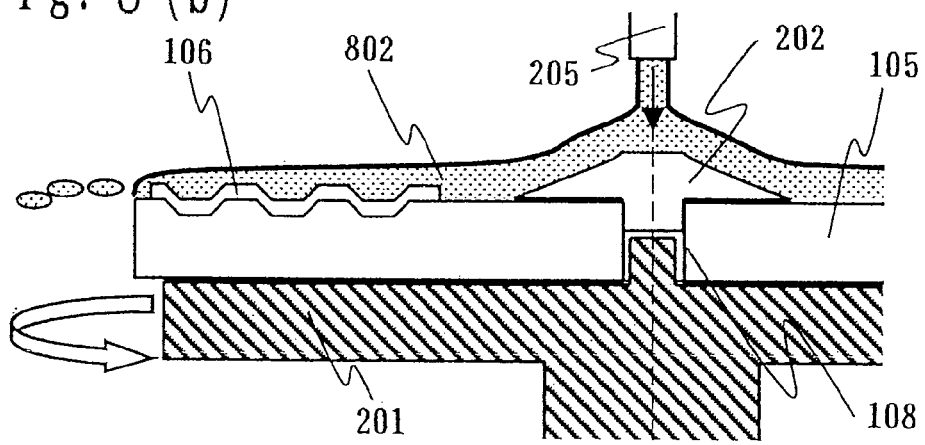
Figure 8C:
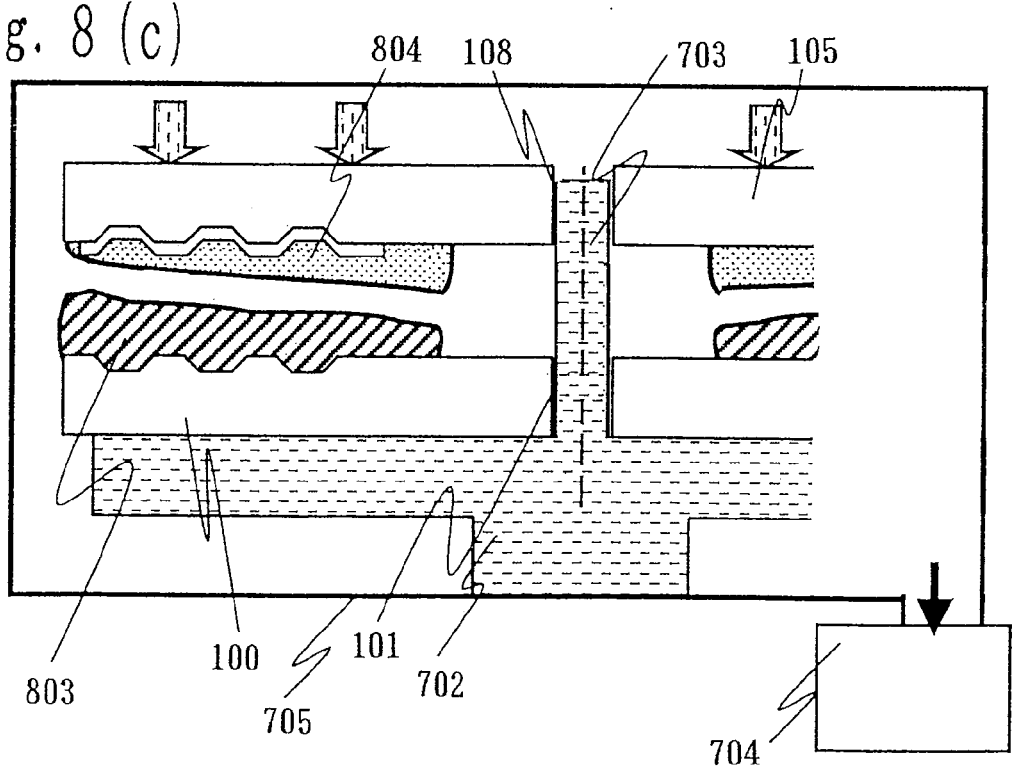

This is followed by bonding with the signal substrate. As shown in FIG. 8(*b*), the signal substrate 105 which seats the signal recording film 106 is fixed on the rotation table 201 by a method similar to that described with reference to FIGS. 2 and 3, the center hole 108 is covered with the lid 202 whose diameter is 22 mm, and an UV curable resin for adhesion 802 is applied from the nozzle 205. The rotation table 201 is rotated while dripping the UV curable resin 802. At this stage, the signal substrate 105 may be similar to that used in the embodiments 1 and 2. The UV curable resin 802 is of an acrylic resin exhibiting 200 mPa·s, unlike in the embodiment 1. The resin dripping time is 9 sec. The initial 6 sec is a low speed, the subsequent number of revolutions is 2000 rpm, and the rotation time is 10 sec. The lid 202 is removed after the end of the rotations. A thickness distribution of the resulting adhesive layer 804 is as shown in FIG. 9(*b*). The layer is 17 microns in the inner round portion and 15 through 16 microns in the outer round portion. This means that the rotating condition is controlled so that the layer will become gradually thinner through the outer rounds.

At last, the signal substrate 105 and the mold which seats thus hardened transfer layer 803 are loaded into a depressurizing chamber as that shown in FIG. 8(*c*) and superposed one atop the other under a reduced pressure, without hardening the UV curable resin 802. The depressurizing chamber 705 is depressurized by means of the vacuum pump 704. The center pin 703 of the table 702 aligns the signal substrate 105 and the mold 100 at the center. The signal substrate 105 and the mold 100 now placed one atop the other are irradiated with UV light, thereby hardening the adhesive layer 804. The mold 100 is peeled off by the method shown in FIG. 6, after the hardening. FIG. 9(*c*) shows a thickness distribution of the resulting isolation layer (which is comprised of the transfer layer and the adhesive layer). Since the thickness distributions along the radius direction of the transfer layer 103 and the adhesive layer 804 are each controlled, the thickness distribution of the isolation layer is within a range of 25.5±0.5 microns and thus considerably uniform.

Steps after the peeling are similar to those described in relation to the embodiment 1 and therefore will not be described again.

While the embodiment 3 requires to form the adhesive layer 804 on the signal substrate 105 for stable fabrication, the adhesive layer 804 may be formed on the hardened transfer layer 803 which is on the mold 100 and placed on a signal substrate which does not comprise an adhesive layer. Alternatively, the adhesive layer 804 may be formed on the signal substrate 105 and hardened with the lid 202 removed, and superposed within the depressurizing chamber 705 without hardening the stretched transfer layer 801 which is shown in FIG. 8(*a*).

This demands to harden the transfer layer 801 which was stretched by means of UV light after superposition, and it therefore is essential that the UV curable resin for transfer exhibits sufficiently strong adhesion with the hardened adhesive layer. Otherwise, peeling at the interface between the mold 100 and the transfer layer will not work well at the peeling step. In either case, it is important to determine a rotating condition so as to obtain a desired thickness distribution for the transfer layer or the adhesive layer to which the UV curable resin for transfer is to be applied.

In addition, after the step shown in FIG. 8(*c*), the signal substrate 105 and the mold 100 superposed one atop the other may be unloaded from the depressurizing chamber 705 and loaded into a pressurizing chamber, to thereby collapse very small air bubbles (which contain depressurized air inside) by means of autoclave.

Embodiment 4

In relation to the embodiment 4, examples will be described in which the transfer layer or the adhesive layer is of a pressure-sensitive adhesive.

The first example is that the transfer layer is of an UV curable resin as in the embodiments 1 through 3 described above while the adhesive layer is of a pressure-sensitive adhesive. The transfer layer is formed in a similar fashion to that shown in FIG. 8(*a*) which shows the embodiment 3. The method shown in FIG. 8(*a*) does not use a lid unlike the methods shown in FIGS. 2 and 3, and therefore, is easy to implement. When the same UV curable resin for transfer as that used in the embodiment 3 is used, a thickness distribution becomes as shown in FIG. 9(*a*). A method of forming the transfer layer is similar to that described above and therefore will not be described again. When a pressure-sensitive adhesive is used as the adhesive layer, it is necessary that the pressure-sensitive adhesive is prepared in the shape of a disk in advance.

Figure 10:
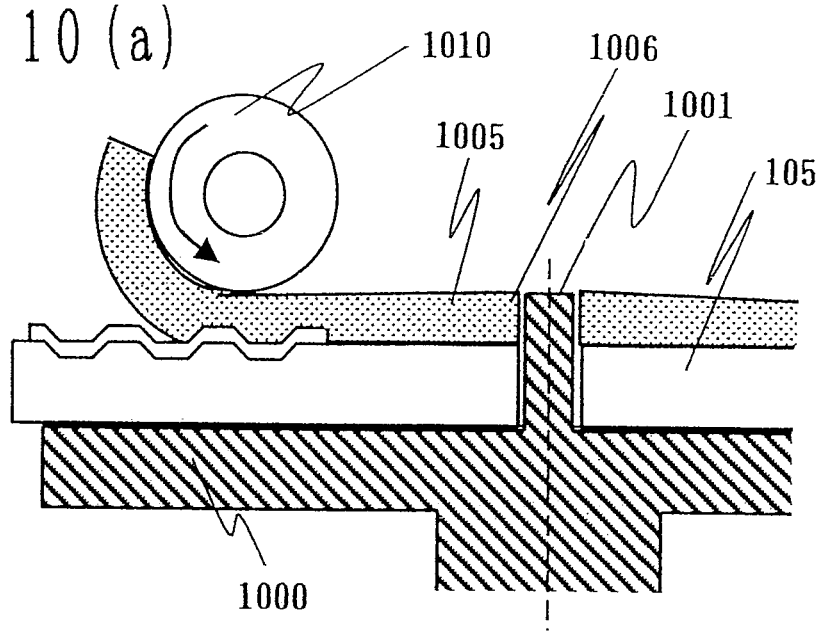
FIG. 10 is a drawing which shows the adhesive layer forming step as it is when a pressure-sensitive adhesive is used as the adhesive layer according to one embodiment of the present invention.
Figure 10:
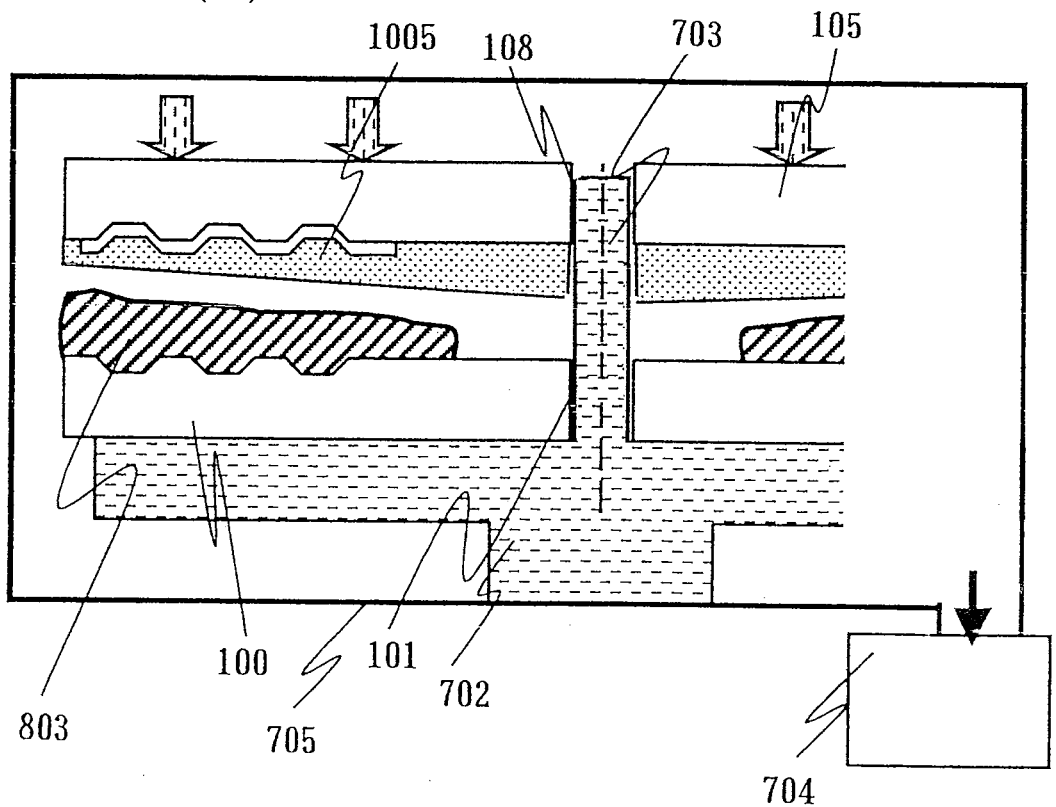

It is necessary to control a thickness distribution of the pressure-sensitive adhesive to that shown in FIG. 9(*b*). Since a pressure-sensitive adhesive is half solid, it is generally easy to control the thickness distribution. FIG. 10 shows methods of fabricating the isolation layer where a pressure-sensitive adhesive is used as the adhesive layer. FIG. 10(*a*) shows a method which requires to bond a pressure-sensitive adhesive 1005 to the signal substrate 105. The pressure-sensitive adhesive 1005 comprises a center hole 1006 and exhibits such a thickness distribution that the adhesive is gradually thinner from inner rounds toward outer rounds. Because of the center hole 1006, it is possible to align to the center of the signal substrate 105, using a center pin 1001 of a fix table 1000. By means of a roller 1010, the pressure-sensitive adhesive 1005 is bonded starting at an outer circumferential edge of the signal substrate 105 through the other outer circumferential edge. The roller 1010 is preferably of surface-treated rubber (through fluorination for instance), so that the roller 1010 will not stick to the pressure-sensitive adhesive 1005. When the roller 1010 is made of rubber, even in atmosphere, it is hard for air bubbles to enter between the pressure-sensitive adhesive 1005 and the signal substrate 105 owing to the elasticity of the rubber.

The step shown in FIG. 10(*a*) may be executed within the depressurizing chamber. When the pressure which pushes the roller 1010 against the pressure-sensitive adhesive 1005 is sufficiently high, it is possible to fill the concave/convex portions on the signal substrate with the pressure-sensitive adhesive 1005. Further, a protection film which prevents sticking to the roller 1010 may be disposed on a surface of the pressure-sensitive adhesive 1005 contacting the roller 1010. FIG. 10(*b*) shows superposition of the mold 100 now seating the hardened transfer layer 803 within the depressurizing chamber 705. The sequence is the same as that described in relation to the embodiments 2 and 3. It is needless to mention that where there is a protection film disposed to the pressure-sensitive adhesive 1005, it is necessary to peel off the protection film prior to this step. In the event that the pressure-sensitive adhesive 1005 has such a characteristic as an UV-hardening characteristic and therefore can harden, the pressure-sensitive adhesive 1005 may be hardened after the superposition. At last the peeling step is executed, thereby obtaining the isolation layer which exhibits a uniform thickness distribution.

Figure 11:
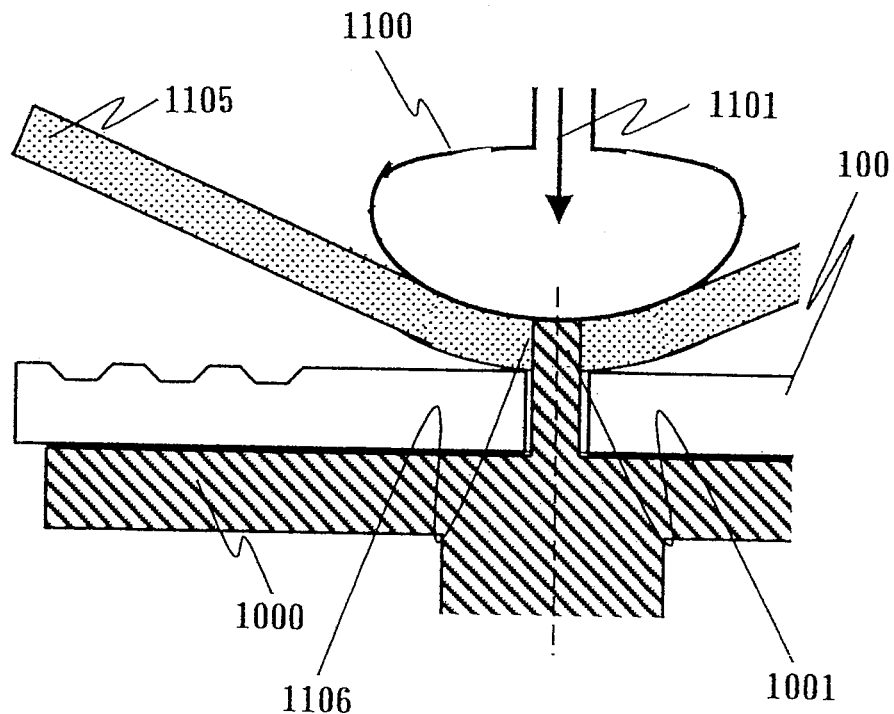
FIG. 11 is a drawing which shows the transfer layer forming step as it is when a pressure-sensitive adhesive is used as the transfer layer according to one embodiment of the present invention.
Figure 11:
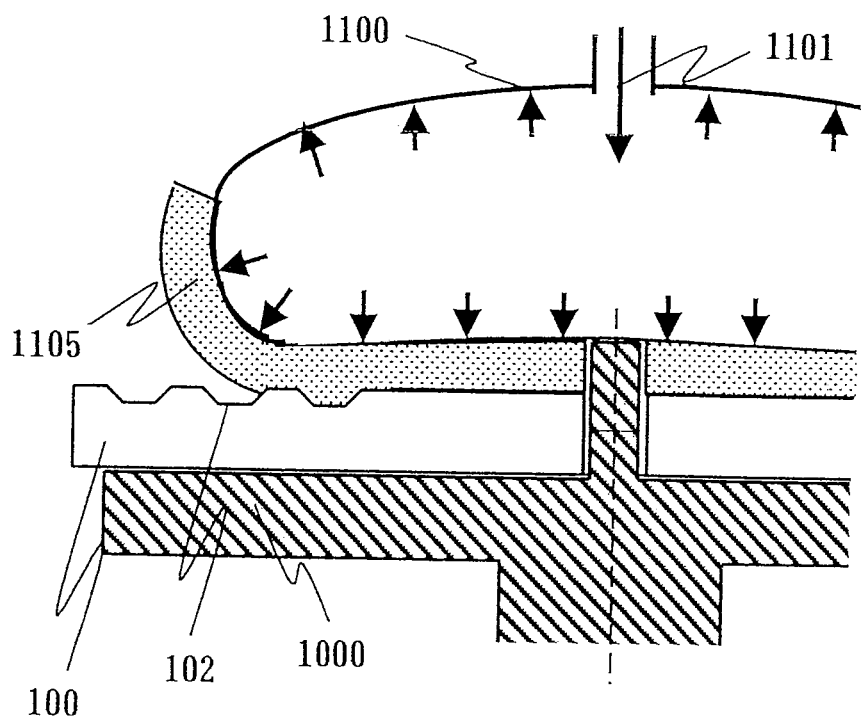
Figure 12:
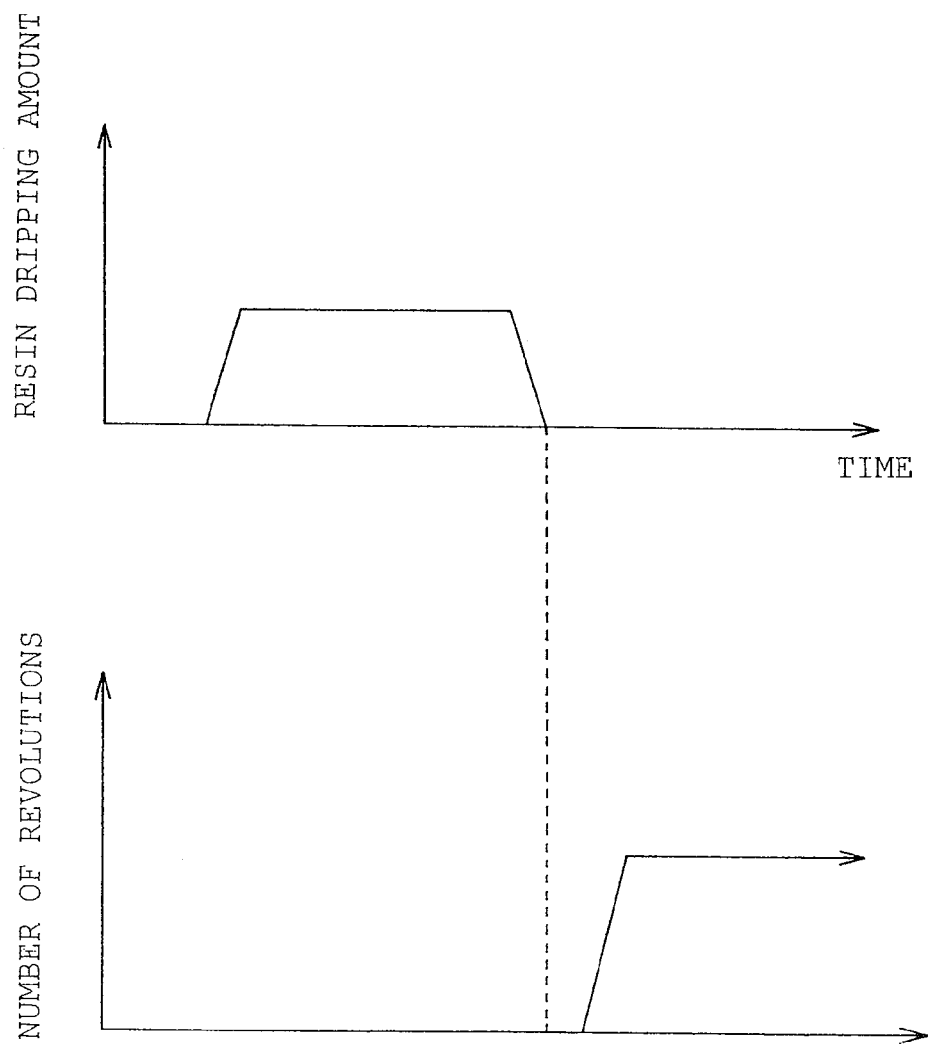
FIG. 12 is a drawing which partially shows a conventional method of manufacturing a multi-layer optical information recording medium.
Figure 13:
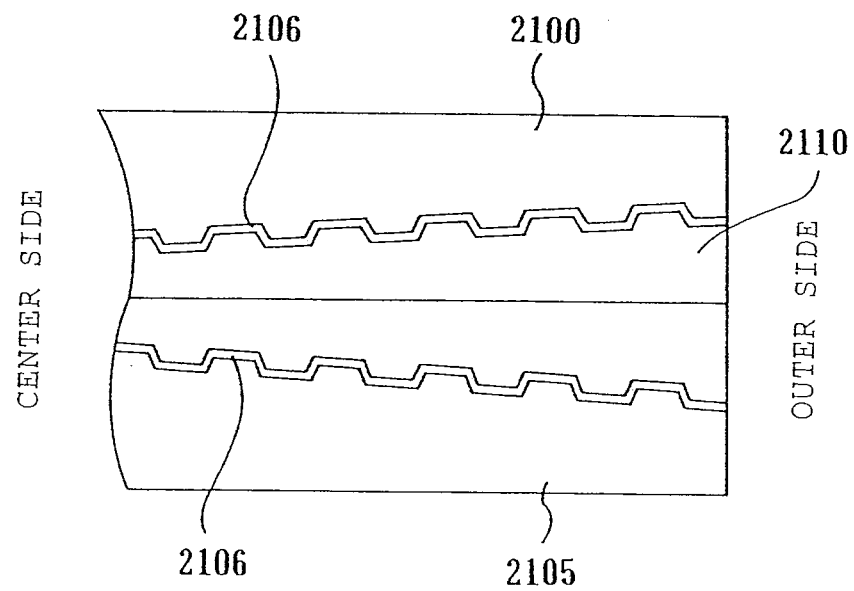
FIG. 13 is a cross sectional view of a multi-layer optical information recording medium which is manufactured by the conventional technique.

The second example is that the transfer layer is of a pressure-sensitive adhesive which hardens to UV light while the adhesive layer is of an UV curable resin. The adhesive layer is the same as that shown in FIGS. 7(a) and (b) and therefore will not be described again. FIG. 11 shows a method of superposing a pressure-sensitive adhesive for transfer 1105 on the mold 100 using a balloon 1100. The pressure-sensitive adhesive 1105 is formed so as to exhibit a thickness distribution that the adhesive is gradually thinner from inner rounds through outer rounds. As FIG. 11(a), the pressure-sensitive adhesive 1105 comprises a center hole 1106, and is registered to the center of the mold 100 by means of the center pin 1001 of the fix table 1000. The balloon 1100 is moved down from above the center of the fix table 1000, and air 1101 is gradually introduced. The balloon 1100 is preferably of surface-treated rubber (through fluorination for instance), so that the balloon 1100 will not stick to the pressure-sensitive adhesive 1105.

As the air 1101 enters the balloon 1100, the balloon 1100 which is elastic swallows up as shown in FIG. 11(b), thereby causing the pressure-sensitive adhesive 1105 to contact the mold 100 starting at the center of the mold 100 toward the outer circumferential edge of the mold 100. The elasticity of the balloon 1100 and the gradual contact of the pressure-sensitive adhesive 1105 with the mold 100 prevent air bubbles from entering into the interface between the pressure-sensitive adhesive 1105 and the mold 100. In addition, the pressure-sensitive adhesive 1105 is pushed by the balloon 1100 and hence the concave/convex portions 102 on the mold 100 is filled with the pressure sensitive adhesive 1105. After this step, UV light is irradiated and the pressure-sensitive adhesive 1105 is accordingly hardened. The hardening prevents the concave/convex portions 102 formed in the pressure-sensitive adhesive 1105 from getting deformed even at the peeling step. The hardening of the pressure-sensitive adhesive is followed by superposition of the signal substrate and hardening of the adhesive layer by a similar method to that shown in FIG. 7(c), and at last, the peeling step is executed.

While the foregoing has described the embodiment 4 in relation to an example that a roller is used for the method of forming the adhesive layer and a balloon is used for the method of forming the transfer layer, a balloon may be used for the method of forming the adhesive layer and a roller may be used for the method of forming the transfer layer.

Further, the embodiment 4 relates to an example that the transfer layer or the adhesive layer is of a pressure-sensitive adhesive, both the transfer layer and the adhesive layer may be of a pressure-sensitive adhesive. In addition, the thickness distribution of the UV curable resin described above may be controlled such that the resin is gradually thinner from inner rounds through outer rounds, to thereby control the thickness distribution of the pressure-sensitive adhesive such that the adhesive becomes gradually thicker from inner rounds through outer rounds.

With the method of and the apparatus for manufacturing a multi-layer optical information recording medium described above, it is possible to control the thickness distribution of the isolation layer which comprises the transfer layer and the adhesive layer, and hence, make the thickness of the isolation layer uniform. This permits to stably record in and reproduce from the signal recording layers which are disposed on the both sides of the isolation layer, and hence, to obtain an excellent signal. Further, it is possible to provide a production margin for a variation in thickness of the isolation layer, and therefore, improve the mass productivity.

Figure 14:
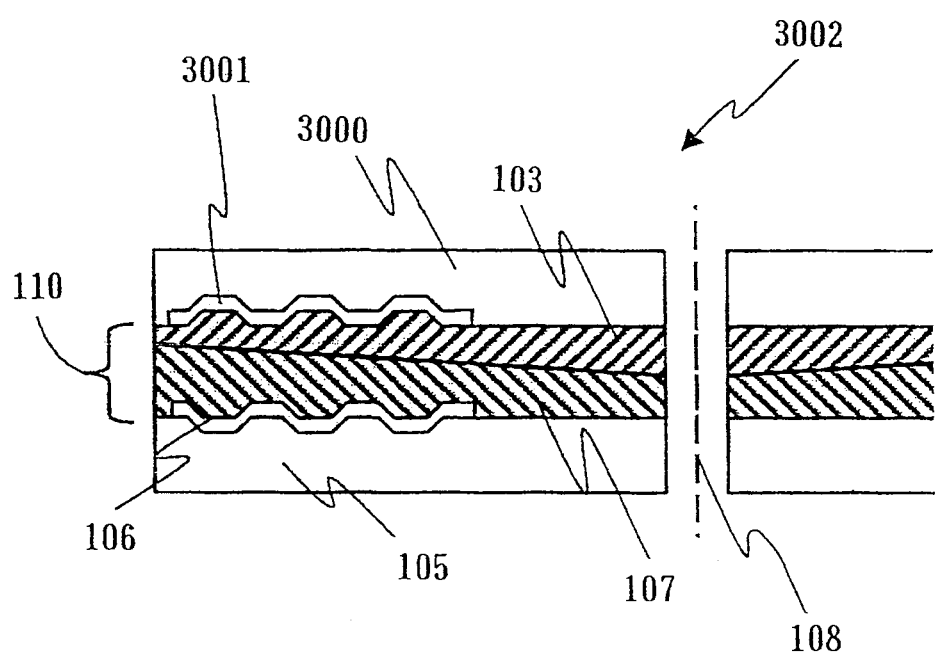
FIG. 14 is a cross sectional view of a multi-layer optical information recording medium which is manufactured by the manufacturing method according to the present invention.

FIG. 14 shows one example of a multi-layer optical information recording medium 3002 which is manufactured in this manner. A cross section of the multi-layer optical information recording medium 3002 which is manufactured by the manufacturing method according to the embodiments of the present invention shows that the interface between the transfer layer 103 and the adhesive layer 107 which form the isolation layer 110 is inclined from the center toward the outer side and that the isolation layer 110 has a constant level of thickness along the radius direction. In this case, the extent of the inclination varies depending on a manufacturing condition. It is possible that the interface will become substantially horizontal in some cases.

Further, in the description above, with respect to the thickness distributions along the radius direction of the transfer layer and the adhesive layer, the both thickness distributions may be controlled such that the two complements with each other or the thickness distribution of one of the layers may be controlled considering the thickness distribution of the other one of the layers, in which case if the total thickness of the transfer layer and the adhesive layer is uniform along the radius direction, an effect similar to that described above is obtained. Still further, the thickness distributions along the radius direction of the transfer layer and the adhesive layer may each be uniform.

Figure 15:
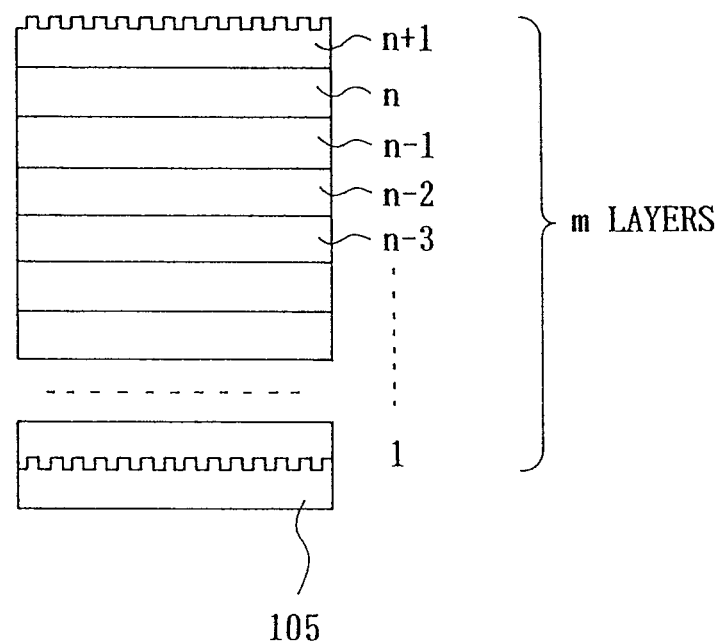
FIG. 15 is a drawing which shows the modified embodiment of the present invention.

In addition, although the foregoing has described that the isolation layer is formed by two layers of the transfer layer and the adhesive layer, the isolation layer may be formed by a plurality of layers which may be three or more. When the isolation layer is formed by three layers for instance, the signal substrate according to the present invention corresponds to the signal substrate 105 and the $n-1^{-th}$ layer which is formed on the signal substrate 105. In the event that the isolation layer is formed by m layers, the signal substrate according to the present invention corresponds to the signal substrate 105 and a layer which is lamination of the first through the $n-1^{-th}$ layer. FIG. 15 shows an example of such a signal substrate.

The configuration that the $n+1^{th}$ layer and the $n^{-th}$ layer are formed and the thickness distribution of one of the layers is controlled considering the thickness distribution of the other layer includes a configuration that the thickness distribution of the one layer is controlled considering a thickness distribution which is observed on an immediately precedent production batch. In this case, the thickness distribution of one of the layers may be controlled while considering a thickness distribution of a prototype which may be the very first production batch.

While the embodiments 1 through 4 are on an example that there is only one isolation layer, the present invention is not limited to this. There may be a plurality of isolation layers, in which case the present invention is applied to at least one of the plurality of isolation layers.

In addition, as in the embodiments 2 and 3, after FIG. 10(b), the signal substrate 105 and the mold 100 superposed one atop the other may be unloaded from the depressurizing chamber 705 and loaded into a pressurizing chamber, to thereby collapse very small air bubbles (which contain depressurized air inside) by means of autoclave.

While the foregoing has described the embodiments 1 through 4 in relation mainly to the method of manufacturing a multi-layer optical information recording medium according to the present invention, the respective means which form the apparatus for manufacturing a multi-layer optical information recording medium according to the present invention are the rotation table, the nozzle and the like which are used at the respective steps shown in FIGS. 2 through 4, 6 through 8, 10 and 11.

Further, although the foregoing has described that the signal recording layers according to the present invention is the signal recording film 106, the signal recording layers according to the present invention may be formed by guide grooves or pits.

Still further, although the foregoing has described that the radiation curable material according to the present invention is an UV curable resin, the radiation curable material according to the present invention may be any other material which hardens to radiation.

As described above, the method of and the apparatus for manufacturing a multi-layer optical information recording medium according to the present invention allow to stably record in and reproduce from the signal recording layers which are disposed on the both sides of the isolation layer, and hence, to obtain an excellent signal.

What is claimed is:

1. A method of manufacturing a multi-layer optical information recording medium that has a signal surface, on which recording and reproduction are performed, and an isolation layer between adjacent signal recording layers for isolating said adjacent signal recording layers from each other, the method comprising the steps of:
   (a) forming an $n+1^{-th}$ layer for a positive integer n; and
   (b) forming an $n^{-th}$ layer adjacent to said $n+1^{-th}$ layer,
      wherein said isolation layer is formed by an $n+1$ number of layers consisting of first through $n+1^{-th}$ layers that are stacked in an ascending order,
      said $n+1^{-th\ layer}$ and said $n^{-th}$ layer are each formed so that an interface between said $n+1^{-th}$ layer and said $n^{-th}$ layer includes a slope inclined with respect to said signal surface in a radius direction,
      a thickness distribution of said $n+1^{-th}$ layer along the radius direction is opposite a thickness distribution of an n number of layers consisting of said first through $n^{-th}$ layers along the radius direction, and
      a thickness distribution of said isolation layer along the radius direction is substantially uniform.

2. The method of manufacturing a multi-layer optical information recording medium of claim 1, wherein said $n+1^{-th}$ layer is formed so as to be adjacent to a surface on a mold in which there is a signal recording area which contains at least one of a guide groove and a pit, and
   said $n^{-th}$ layer is formed so as to be adjacent to a signal substrate which comprises said signal recording layers.

3. The method of manufacturing a multi-layer optical information recording medium of claim 2, further comprising a step of peeling said mold off from said $n+1^{-th}$ layer.

4. The method of manufacturing a multi-layer optical information recording medium of claim 2, wherein the thickness distribution along the radius direction of said $n+1^{-th}$ layer is that the layer is thinner in an outer round portion than in an inner round portion of said mold, while the thickness distribution along the radius direction of said $n^{-th}$ layer is that the layer is thicker in an outer round portion than in an inner round portion in said signal substrate.

5. The method of manufacturing a multi-layer optical information recording medium of claim 4, wherein said $n+1^{-th}$ layer is of a radiation curable material, and said step (a) comprises a step of dripping said radiation curable material onto said inner round portion of said mold or said inner round portion within said $n^{-th}$ layer of said signal substrate and a step of rotating said mold or said signal substrate to which said radiation curable material has been dripped.

6. The method of manufacturing a multi-layer optical information recording medium of claim 5, wherein said step of rotating said mold or said signal substrate to which said radiation curable material has been dripped is followed by a step of superposing said mold and said signal substrate one atop the other in such a manner that said $n+1^{-th}$ layer is positioned on the inner side,
   and further by a step of emitting radiation and accordingly irradiating said radiation curable material.

7. The method of manufacturing a multi-layer optical information recording medium of claim 4, wherein said step (a) comprises a step of dripping a radiation curable material onto said inner round portion of said mold or said inner round portion within said $n^{-th}$ layer of said signal substrate and a step of rotating said mold or said signal substrate to which said radiation curable material has been dripped.

8. The method of manufacturing a multi-layer optical information recording medium of any one of claims 5 through 7, wherein said step of dripping said radiation curable material onto said inner round portion of said mold or said inner round portion within said $n^{-th}$ layer of said signal substrate and said step of rotating said mold or said signal substrate to which said radiation curable material has been dripped are executed simultaneously.

9. The method of manufacturing a multi-layer optical information recording medium of any one of claims 5 through 7, wherein said mold or said signal substrate is rotated while dripping said radiation curable material onto said inner round portion of said mold or said inner round portion within said $n^{-th}$ layer of said signal substrate.

10. The method of manufacturing a multi-layer optical information recording medium of any one of claims 5 through 7, wherein before dripping said radiation curable material onto said inner round portion of said mold or said inner round portion within said $n^{-th}$ layer on said signal substrate, in the event that there is a center hole approximately at the center of said mold or said $n^{-th}$ layer of said signal substrate, said center hole is capped with a lid and said radiation curable material is then dripped from above said lid.

11. The method of manufacturing a multi-layer optical information recording medium of claim 2, wherein the thickness distribution along the radius direction of said $n+1^{-th}$ layer is thicker in an outer round portion than in an inner round portion of said mold, while the thickness distribution along the radius direction of said $n^{-th}$ layer is thinner in an outer round portion than in an inner round portion in said signal substrate.

12. The method of manufacturing a multi-layer optical information recording medium of claim 11, wherein said $n^{-th}$ layer is of a radiation curable material, and said step (b) comprises: a step of dripping said radiation curable material onto said inner round portion within said $n+1^{-th}$ layer of said mold or said inner round portion of said signal substrate; a step of rotating said mold or said signal substrate to which said radiation curable material has been dripped; a step of superposing said mold and said signal substrate one atop of the other after the rotation in such a manner that a surface coated with said radiation curable material is directed toward the inner side; and a step of emitting radiation and accordingly hardening said radiation curable material.

13. The method of manufacturing a multi-layer optical information recording medium of claim 12, wherein said step of dripping said radiation curable material onto said inner round portion of said mold or said inner round portion of said signal substrate and said step of rotating said mold or said signal substrate to which said radiation curable material has been dripped are executed simultaneously.

14. The method of manufacturing a multi-layer optical information recording medium of claim 13, wherein the rotation is effected while dripping said radiation curable material onto said inner round portion of said mold or said inner round portion of said signal substrate.

15. The method of manufacturing a multi-layer optical information recording medium of any one of claims 12 through 14, wherein before dripping said radiation curable material, in the event that there is a center hole approximately at the center of said mold or said signal substrate, said center hole is capped with a lid and said radiation curable material is then dripped from above said lid.

16. The method of manufacturing a multi-layer optical information recording medium of claim 6 or 12, wherein said step of superposing in such a manner that a surface of said mold or said signal substrate coated with said radiation curable material is directed toward the inner side is executed under a reduced pressure.

17. The method of manufacturing a multi-layer optical information recording medium of claim 4 or 11, wherein said $n+1^{-th}$ layer contains a pressure-sensitive adhesive which hardens when irradiated with radiation.

18. The method of manufacturing a multi-layer optical information recording medium of claim 4 or 11, wherein said $n^{-th}$ layer contains a pressure-sensitive adhesive.

19. The method of manufacturing a multi-layer optical information recording medium of claim 4, wherein said $n^{-th}$ layer is of a radiation curable material, and said step (b) comprises: a step of dripping said radiation curable material for adhesion which is for forming said $n^{-th}$ layer onto at least one of said $n+1^{-th}$ layer of said mold and said signal substrate; a step of rotating said mold and said signal substrate, with said mold and said signal substrate superposed one atop of the other in such a manner that said $n+1^{-th}$ layer is positioned on the inner side, so as to stretch said radiation curable material for adhesion; and a step of emitting radiation and accordingly hardening said radiation curable material.

20. The method of manufacturing a multi-layer optical information recording medium of claim 11, wherein said $n+1^{-th}$ layer is of a radiation curable material, and said step (a) comprises: a step of dripping said radiation curable material for transfer which is for forming said $n+1^{-th}$ layer onto at least one of said mold and said $n^{-th}$ layer on said signal substrate; a step of rotating said mold and said signal substrate, with said mold and said signal substrate superposed one atop of the other in such a manner that said $n^{-th}$ layer is positioned on the inner side, so as to stretch said radiation curable material for transfer; and a step of emitting radiation and accordingly hardening said radiation curable material.

* * * * *